US012804206B2

(12) United States Patent
Pang et al.

(10) Patent No.: US 12,804,206 B2
(45) Date of Patent: Nov. 17, 2026

(54) END-TO-END LEARNING-BASED POINT CLOUD CODING FRAMEWORK

(71) Applicant: InterDigital VC Holdings, Inc., Wilmington, DE (US)

(72) Inventors: Jiahao Pang, New York, NY (US); Muhammad Asad Lodhi, New York, NY (US); Junghyun Ahn, New York, NY (US); Dong Tian, Wilmington, DE (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 245 days.

(21) Appl. No.: 18/679,144

(22) Filed: May 30, 2024

(65) Prior Publication Data

US 2025/0373863 A1 Dec. 4, 2025

(51) Int. Cl.

| | |
|---|---|
| ***H04N 19/96*** | (2014.01) |
| ***H04N 19/136*** | (2014.01) |
| ***H04N 19/42*** | (2014.01) |
| ***H04N 19/597*** | (2014.01) |
| ***H04N 19/70*** | (2014.01) |
| ***H04N 19/91*** | (2014.01) |

(52) U.S. Cl.

CPC ........... *H04N 19/96* (2014.11); *H04N 19/136* (2014.11); *H04N 19/42* (2014.11); *H04N 19/597* (2014.11); *H04N 19/70* (2014.11); *H04N 19/91* (2014.11)

(58) Field of Classification Search

CPC ...... H04N 19/96; H04N 19/136; H04N 19/42; H04N 19/597; H04N 19/70; H04N 19/91

See application file for complete search history.

(56) References Cited

U.S. PATENT DOCUMENTS

| | | | |
|---|---|---|---|
| 2021/0104077 | A1 | 4/2021 | Zakharchenko et al. |
| 2025/0022183 | A1 | 1/2025 | Lasserre et al. |

FOREIGN PATENT DOCUMENTS

| | | | |
|---|---|---|---|
| WO | WO2024011417 | A1 | 1/2024 |
| WO | WO2024015454 | A1 | 1/2024 |

OTHER PUBLICATIONS

Wysocki et al, "Combining Visibility Analysis and Deep Learning for Refinement of Semantic 3D Building Models By Conflict Classification", 2023, arXiv:2303.05998v1 (8 Pages) (Year: 2023).*

(Continued)

*Primary Examiner* — David F Dunphy

(74) *Attorney, Agent, or Firm* — Xiaoan Lu

(57) ABSTRACT

In one implementation, point cloud data for a point cloud is decoded. The decoder obtains features representing voxels in a tree structure, where feature for a current voxel is representative of at least a set of voxels that are still to be reconstructed. The decoder then determines an occupancy probability of the current voxel based on the feature, and decodes occupancy information of voxels in the tree structure, where whether a current voxel is occupied or not is decoded based on the occupancy probability for the current voxel. The point cloud can be reconstructed based on the occupancy information. On the encoder side, the feature for the current voxel is obtained from the voxels that are still to be encoded and encoded into a bitstream.

20 Claims, 23 Drawing Sheets

(56) References Cited

OTHER PUBLICATIONS

Octree [online]. Wikipedia, 2026 [retrieved on Mar. 27, 2026]. Retrieved from the Internet: <URL: https://en.wikipedia.org/w/index.php?title=Octree&oldid=1330734964> (5 Pages) (Year: 2026).*

Hornung et al, "OctoMap: an efficient probabilistic 3D mapping framework based on octrees", 2013, Auton Robot (2013) 34:189-206 (18 Pages) (Year: 2013).*

Sengupta et al, "Semantic Octree: Unifying Recognition, Reconstruction and Representation via an Octree Constrained Higher Order MRF", 2015, 2015 IEEE International Conference on Robotics and Automation (ICRA), pp. 1874-1879 (6 Pages) (Year: 2015).*

Kadam et al., "[AI-3DGC] [EE5.3-related] [New] Unified Intra/Inter Deep Dynamic Point Cloud Compression With Multiple Reference Frames Rate Adaption", 141., MPEG Meeting, Jan. 16-Jan. 20, 2023, Online, Motion Picture Expert Group or ISO/IEC JTC1/SC29/WG11, No. M62066, Jan. 2023, 24 pages.

Lodhi et al., "[AI-GC] [cfP-response] UniFHiD Part 1: InterDigital's answer to MPEG AI-PCC for Track 1 Geometry-only" 148. MPEG Meeting; Nov. 4-Nov. 8, 2024; Kemer; (Motion Picture Expert Group or ISO/IEC JTC1/SC29/WG11) No. m70282, Kemer, Nov. 2024, 32 pages.

Wang et al., "[AI-3DGC][EE5.3-related] Dynamic SparsePCGC Update", 140. MPEG Meeting; Oct. 24-Oct. 28, 2022; ISO/IEC JTC 1/SC 29/WG 7 m61006, Oct. 2022, 7 pages.

Xu et al., "[AI-3DGC]A Deep Dynamic Point Cloud Geometry Compression Framework for AI-based PCC", 137. MPEG Meeting; Jan. 17-Jan. 21, 2022; Online; (Motion Picture Expert Group or ISO/IEC JTC1/SC29/ WG11) No. m58780 Jan. 13, 2022, 7 pages.

Wang et al., "Dynamic Point Cloud Geometry Compression Using Multiscale Inter Conditional Coding", arxiv.org, Cornell University Library, 201 Olin Library Cornell University Ithaca, NY 14853, Jan. 28, 2023 (Jan. 28, 2023), 5 pages.

Wang et al., "Multiscale Point Cloud Geometry Compression", 2021 Data Compression Conference IEEE, Mar. 23, 2021, pp. 73-82.

Kaya et al., "Neural Network Modeling of Probabilities for Coding the Octree Representation of Point Clouds", 2021 IEEE 23rd International Workshop on Multimedia Signal Processing (MMSP) | 978-1-6654-3288, 6 pages.

Que et al., "VoxelContext-Net: An Octree based Framework for Point Cloud Compression", Cornell University Library, Computer Science, Computer Vision and Pattern Recognition, Document: arXiv:2105.02158v1, May 5, 2021, 10 pages.

Huang, et al., "OctSqueeze: Octree-Structured Entropy Model for LiDAR Compression", Proceedings of the IEEE/CVF Conference on Computer Vision and Pattern Recognition, 2020, pp. 1313-1323.

Balle et al., "Variational Image Compression with a Scale Hyperprior", ICLR 2018 Conference Track, 6th International Conference on Learning Representations, Apr. 30, 2018, 47 pages.

* cited by examiner

END-TO-END LEARNING-BASED POINT CLOUD CODING FRAMEWORK

TECHNICAL FIELD

The present embodiments generally relate to a method and an apparatus for point cloud compression and processing.

BACKGROUND

The Point Cloud (PC) data format is a universal data format across several business domains, e.g., from autonomous driving, robotics, augmented reality/virtual reality (AR/VR), civil engineering, computer graphics, to the animation/movie industry. 3D LiDAR (Light Detection and Ranging) sensors have been deployed in self-driving cars, and affordable LiDAR sensors are released from Velodyne Velabit, Apple ipad Pro 2020 and Intel RealSense LiDAR camera L515. With advances in sensing technologies, 3D point cloud data becomes more practical than ever and is expected to be an ultimate enabler in the applications discussed herein.

SUMMARY

According to an embodiment, a method of decoding point cloud data for a point cloud is presented, comprising: obtaining features representing voxels in a tree structure, wherein feature for a current voxel is representative of at least a set of voxels that are still to be reconstructed; determining an occupancy probability of the current voxel based on the feature; decoding occupancy information of voxels in the tree structure, wherein whether the current voxel is occupied or not is decoded based on the occupancy probability for the current voxel; and reconstructing the point cloud based on the occupancy information.

According to another embodiment, a method of encoding point cloud data for a point cloud is presented, comprising: obtaining features representing voxels in a tree structure, wherein feature for a current voxel is obtained from at least a set of voxels that are still to be encoded; determining an occupancy probability of the current voxel based on the feature; and encoding occupancy information of voxels in the tree structure, wherein whether the current voxel is occupied or not is encoded based on the occupancy probability for the current voxel.

According to another embodiment, an apparatus for decoding point cloud data for a point cloud is presented, comprising one or more processors and at least one memory coupled to the one or more processors, wherein the one or more processors are configured to: obtain features representing voxels in a tree structure, wherein feature for a current voxel is representative of at least a set of voxels that are still to be reconstructed; determine an occupancy probability of the current voxel based on the feature; decode occupancy information of voxels in the tree structure, wherein whether the current voxel is occupied or not is decoded based on the occupancy probability for the current voxel; and reconstruct the point cloud based on the occupancy information.

According to another embodiment, an apparatus for encoding point cloud data for a point cloud is presented, comprising one or more processors and at least one memory coupled to the one or more processors, wherein the one or more processors are configured to: obtain features representing voxels in a tree structure, wherein feature for a current voxel is obtained from at least a set of voxels that are still to be encoded; determine an occupancy probability of the current voxel based on the feature; and encode occupancy information of voxels in the tree structure, wherein whether the current voxel is occupied or not is encoded based on the occupancy probability for the current voxel.

According to another embodiment, a method of decoding point cloud data for a point cloud is presented, comprising: obtaining a feature representing a current voxel in a tree structure in the point cloud; generating a set of hyperprior parameters based on the feature; decoding the feature of the current voxel in the point cloud based on the set of hyperprior parameters; and generating an occupancy probability of the current voxel based on the feature of the current voxel.

According to another embodiment, a method of encoding point cloud data for a point cloud is presented, comprising: obtaining a feature representing a current voxel in a tree structure in the point cloud; generating a set of hyperprior parameters based on the feature; and encoding the feature of the current voxel in the point cloud based on the set of hyperprior parameters.

According to another embodiment, an apparatus for decoding point cloud data for a point cloud is presented, comprising one or more processors and at least one memory coupled to the one or more processors, wherein the one or more processors are configured to: obtain a feature representing a current voxel in a tree structure in the point cloud; generate a set of hyperprior parameters based on the feature; decode the feature of the current voxel in the point cloud based on the set of hyperprior parameters; and generate an occupancy probability of the current voxel based on the feature of the current voxel.

According to another embodiment, an apparatus for encoding point cloud data for a point cloud is presented, comprising one or more processors and at least one memory coupled to the one or more processors, wherein the one or more processors are configured to: obtain a feature representing a current voxel in a tree structure in the point cloud; generate a set of hyperprior parameters based on the feature; and encode the feature of the current voxel in the point cloud based on the set of hyperprior parameters.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding point cloud data according to the methods described above.

One or more embodiments also provide a computer readable storage medium having stored thereon video data generated according to the methods described above. One or more embodiments also provide a method and apparatus for transmitting or receiving the video data generated according to the methods described above.

DETAILED DESCRIPTION

Figure 1:
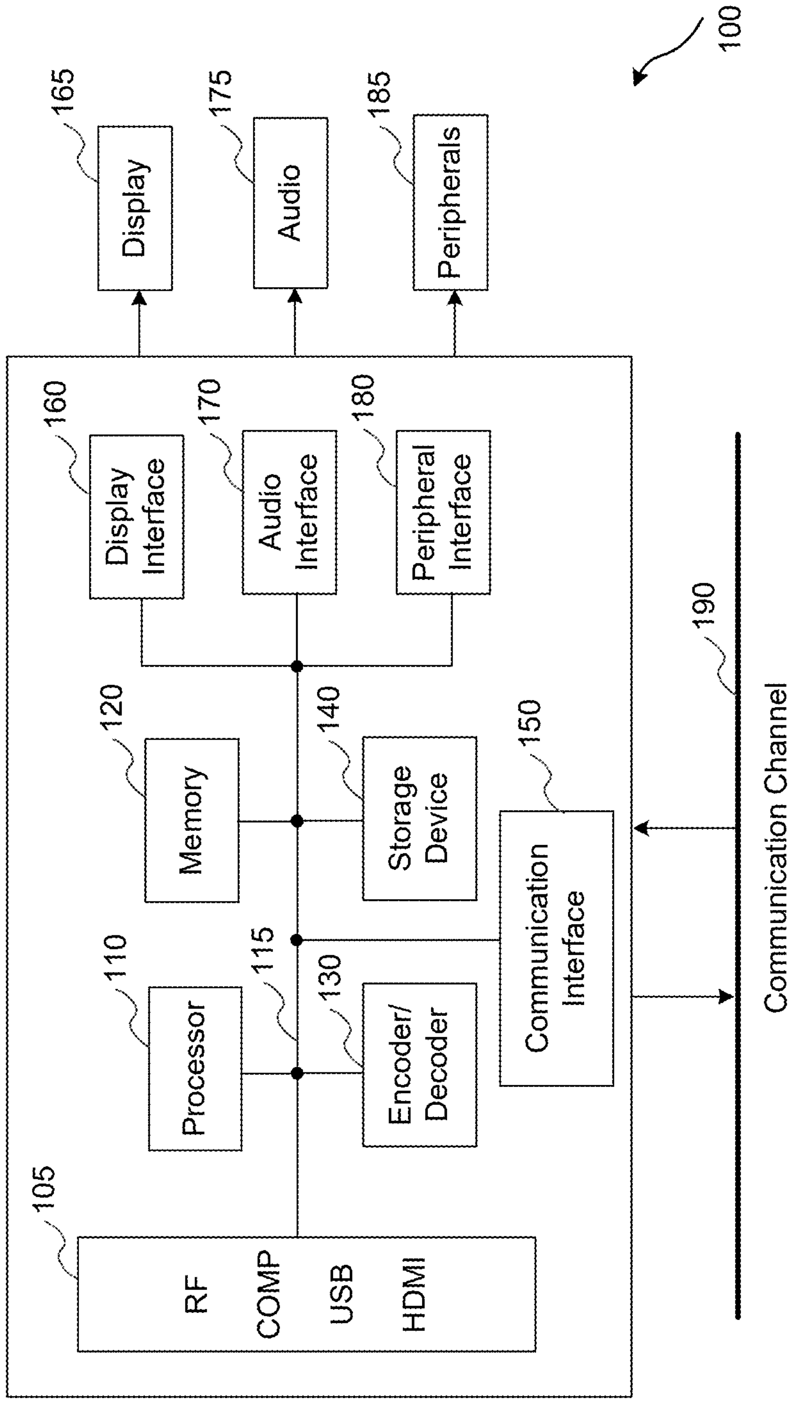
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, JPEG Pleno, MPEG-I, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing. Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

It is contemplated that point cloud data may consume a large portion of network traffic, e.g., among connected cars over 5G network, and immersive communications (VR/AR). Efficient representation formats are necessary for point cloud understanding and communication. In particular, raw point cloud data need to be properly organized and processed for the purposes of world modeling and sensing. Compression on raw point clouds is essential when storage and transmission of the data are required in the related scenarios.

Furthermore, point clouds may represent a sequential scan of the same scene, which contains multiple moving objects. They are called dynamic point clouds as compared to static point clouds captured from a static scene or static objects. Dynamic point clouds are typically organized into frames, with different frames being captured at different times. Dynamic point clouds may require the processing and compression to be in real-time or with low delay.

Each point of the point clouds is represented at least by a 3D position (x, y, z). The set of the 3D positions illustrates the geometry of the object/scene that the point cloud is captured from. Additionally, each point of the point cloud can be associated with some attributes, depending on the applications. For example, for VR/AR/Gaming, the attribute includes color (r, g, b); for LiDAR, the attribute includes reflectance.

The automotive industry and autonomous car are domains in which point clouds may be used. Autonomous cars should be able to "probe" their environment to make good driving decisions based on the reality of their immediate surroundings. Typical sensors like LiDARs produce (dynamic) point clouds that are used by the perception engine. These point clouds are not intended to be viewed by human eyes and they are typically sparse, not necessarily colored, and dynamic with a high frequency of capture. They may have other attributes like the reflectance ratio provided by the LiDAR as this attribute is indicative of the material of the sensed object and may help in making a decision.

Virtual Reality (VR) and immersive worlds are foreseen by many as the future of 2D flat video. For VR and immersive worlds, a viewer is immersed in an environment all around the viewer, as opposed to standard TV where the viewer can only look at the virtual world in front of the viewer. There are several gradations in the immersivity depending on the freedom of the viewer in the environment. Point cloud is a good format candidate to distribute VR worlds. The point cloud for use in VR may be static or dynamic and are typically of average size, for example, no more than millions of points at a time.

Point clouds may also be used for various purposes such as culture heritage/buildings in which objects like statues or buildings are scanned in 3D in order to share the spatial configuration of the object without sending or visiting the object. Also, point clouds may also be used to ensure preservation of the knowledge of the object in case the object may be destroyed, for instance, a temple by an earthquake. Such point clouds are typically static, colored, and huge.

Another use case is in topography and cartography in which using 3D representations, maps are not limited to the plane and may include the relief. Google Maps is a good example of 3D maps but uses meshes instead of point clouds. Nevertheless, point clouds may be a suitable data format for 3D maps and such point clouds are typically static, colored, and huge.

World modeling and sensing via point clouds could be a useful technology to allow machines to gain knowledge about the 3D world around them for the applications discussed herein. 3D point cloud data are essentially discrete samples on the surfaces of objects or scenes. To fully represent the real world with point samples, in practice it requires a huge number of points. For instance, a typical VR immersive scene contains millions of points, while point clouds typically contain hundreds of millions of points. Therefore, the processing of such large-scale point clouds is computationally expensive, especially for consumer devices, e.g., smartphone, tablet, and automotive navigation system, that have limited computational power.

In order to perform processing or inference on a point cloud, efficient storage methodologies are needed. To store and process an input point cloud with affordable computational cost, one solution is to down-sample the point cloud first, where the down-sampled point cloud summarizes the geometry of the input point cloud while having much fewer points. The down-sampled point cloud is then fed to the subsequent machine task for further consumption. However, further reduction in storage space can be achieved by converting the raw point cloud data (original or down-sampled) into a bitstream through entropy coding techniques for lossless compression.

In addition to lossless coding, many scenarios seek for lossy coding for significantly improved compression ratio while maintaining the induced distortion under certain quality levels. To achieve a less lossy coding, an efficient point feature extractor is necessary to improve the accuracy of the reconstruction within the given resource budget.

Learning-Based Point Cloud Compression

Since point cloud data is composed of two components: geometry information and attribute information, the compression of point clouds can be classified into two categories: geometry coding and attribute coding.

Examples of existing learning-based point cloud geometry compression techniques are deep octree coding, end-to-end feature-based geometry coding. With deep octree coding, neural network-based models are utilized to estimate the occupancy probabilities. Such estimated probabilities are then used to help the arithmetic coder (or other entropy coder) to encode or decode a binary flag indicating whether a child octree voxel is occupied or empty.

In an octree-based representation, the whole space, i.e., a 3D bounding box, is recursively split into an octree structure to represent a point cloud. If the bounding box has a scale of 1×1×1, an octree leaf node corresponds to a point with a size equal to $1/(2^d)\times1/(2^d)\times1/(2^d)$, where index d represents the depth level in the octree counted from 0.

In an octree decomposition tree, the root node covers the whole 3D bounding box. The 3D space is equally split in every direction, i.e., x-, y-, and z-directions, leading to eight (8) voxels. For each voxel, if there are at least one point in it, the voxel is marked to be occupied, represented by '1'; otherwise, it is marked to be empty, represented by '0'. The octree root node is then described by an 8-bit integer number indicating the occupancy information.

To move from an octree level to the next, the space of each occupied voxel is further split into eight (8) child voxels in the same manner. If occupied, each child voxel is further represented by an 8-bit integer number. The splitting of occupied voxels continues until the last octree depth level is reached. The leaves of the octree finally represent the point cloud.

An octree-based point cloud compression algorithm targets to code the octree node using an entropy coder. For efficient entropy coding of the octree nodes, a probability distribution model is typically utilized to allocate a shorter symbol for octree node value which appears with higher probability. A decoder could reconstruct the point cloud from the decoded octree nodes.

The main challenge when using a learning-based method for octree coding is on how to effectively estimate the occupancy probability. With higher accuracy of the estimated probability, the arithmetic coding of the occupancy of octree voxel would use fewer bits. In traditional learning-based octree coding methods, neural network models are typically provided with an input based on the occupancy information from its parent octree level or the derived features from parent octree level. They may additionally use the occupancy information and derived features from sibling octree voxels that are already encoded or decoded. Because there is no access to finer octree level voxel information, such approaches may suffer from a less accurate probability and unnecessary high complexity may be also involved.

As previous learning-based octree coding depends solely on octree voxel occupancy information from parent levels, or a current level that is already encoded/decoded, it is a top-down strategy.

With such learning-based octree codecs, the encoder and decoder conduct the probability estimation procedure using exactly the same method that can be non-learning-based. The only interface between their encoder and decoder is the arithmetic coded occupancy information.

Figure 2:
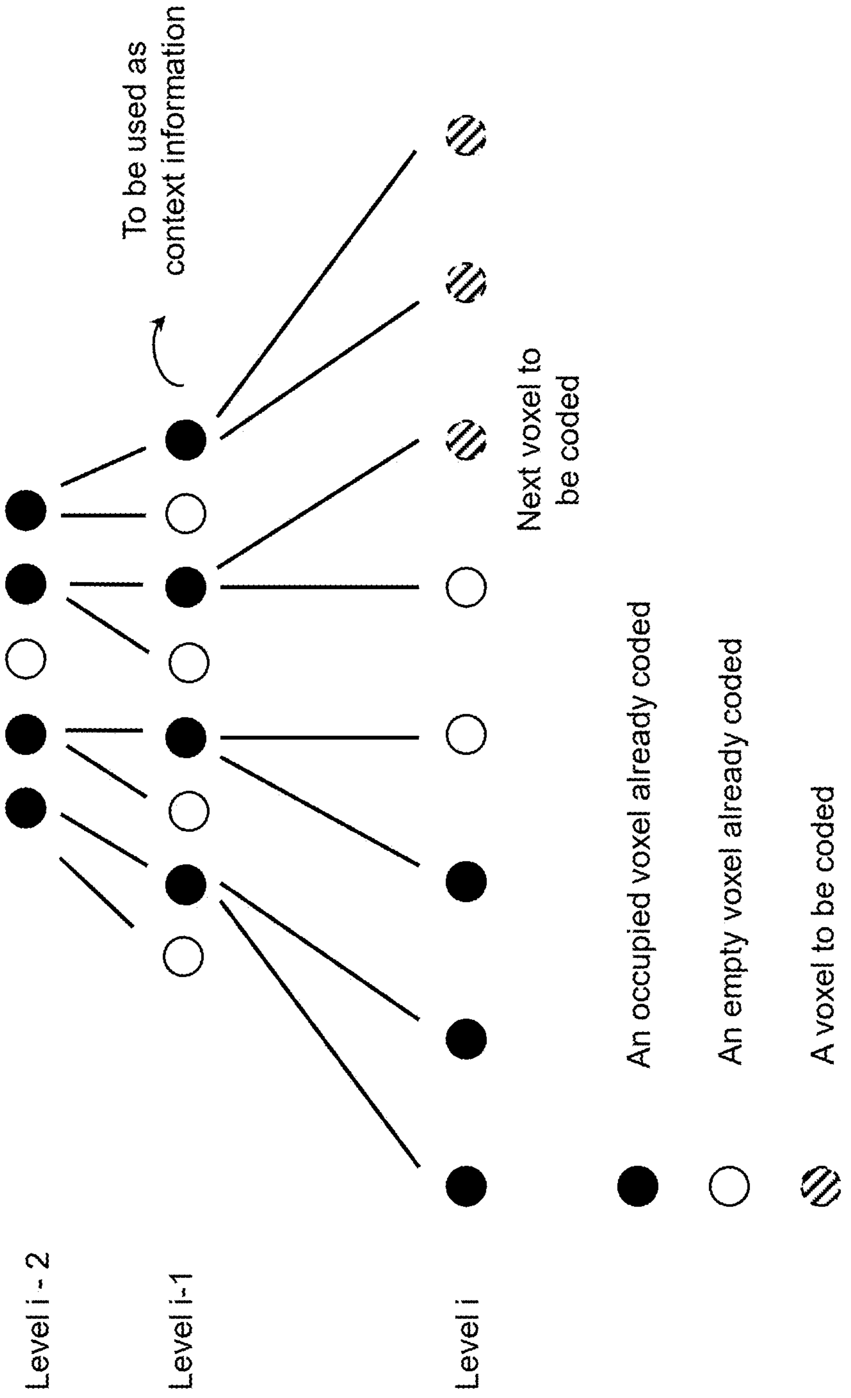
FIG. 2 illustrates voxels in different levels.

FIG. 2 illustrates a portion (level i−2, i−1, i) of an octree to be coded. In FIG. 2, we use a binary tree representing an octree for a point cloud for the purpose of simplifying the drawing. A solid point represents an occupied octree voxel, that has been already encoded or decoded. A circle point represents a non-occupied or empty octree voxel, that has been already encoded or decoded. A circle with shading represents the octree voxels to be encoded or decoded.

Figure 3:
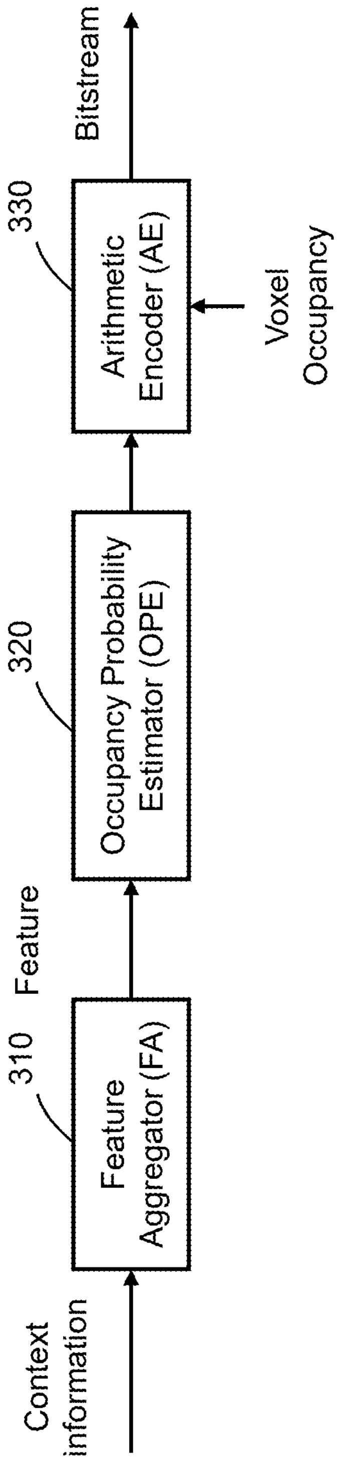
FIG. 3 illustrates learning-based octree encoding.
Figure 4:
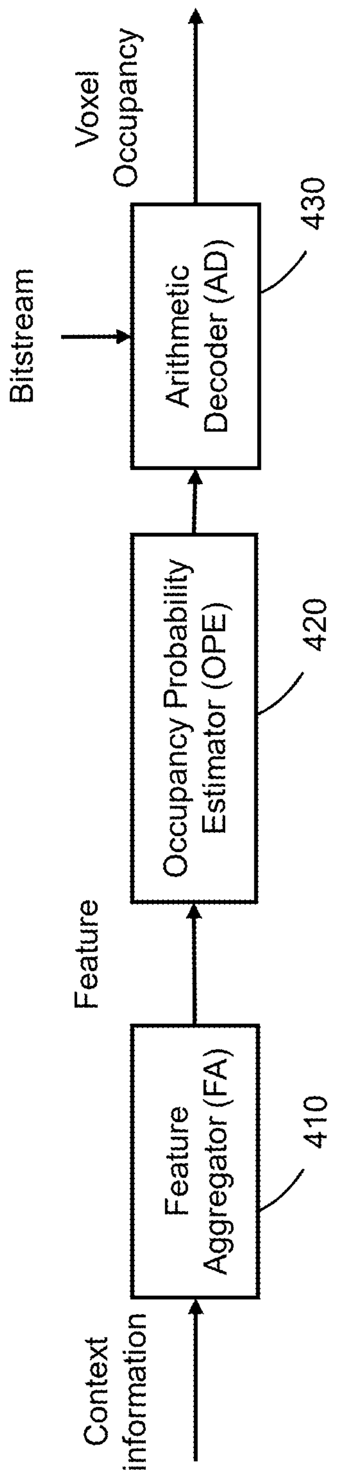
FIG. 4 illustrates learning-based octree decoding.

FIG. 3 and FIG. 4 illustrate the encoding and decoding, respectively, in such top-down methods for octree coding. On the encoder side, the encoder conducts feature extraction/aggregation (310). A neural network model FA is deployed here for the feature extraction/aggregation. Its input is composed of at least the context information, for example, that indicates the occupancy information of voxels in its parent level. Note that no information from finer level of details will be used. Different previous methods utilize different neural network models to implement the feature extraction/aggregation.

The encoder estimates the occupancy probability of one voxel will be occupied or empty. This is achieved by another neural network model OPE (Occupancy Probability Estimator, 320). The encoder performs arithmetic encoding AE (330) according to the actual occupancy of a current octree voxel based on the estimated probability. On the decoder side, the decoder also performs feature aggregation (410) and occupancy probability estimation (420) as the encoder. Then a corresponding arithmetic decoding AD is performed (430) to determine if a current octree voxel is occupied or empty.

In this disclosure, we propose a method that differs from the previous work when coding the tree structures for a point cloud. In the proposed method, the encoding/decoding still proceeds from the root level all the way down to the leaf level, i.e., it is overall still a top-down strategy. However, as the octree voxel occupancy probability is estimated using finer level of details, it is a bottom-up strategy for the encoding/decoding of each individual level. In the proposed method, the encoder not only encodes occupancy information into the bitstream, but also encodes features, which are extracted/aggregated based on information from the finer levels of the octree, into the bitstream. Such features are used to assist the encoder to perform the arithmetic coding of the octree occupancy information. In the proposed method, the decoder first decodes the feature, and then decodes the octree occupancy information based on the decoded feature.

Proposed Basic Encoding Method

Figure 5:
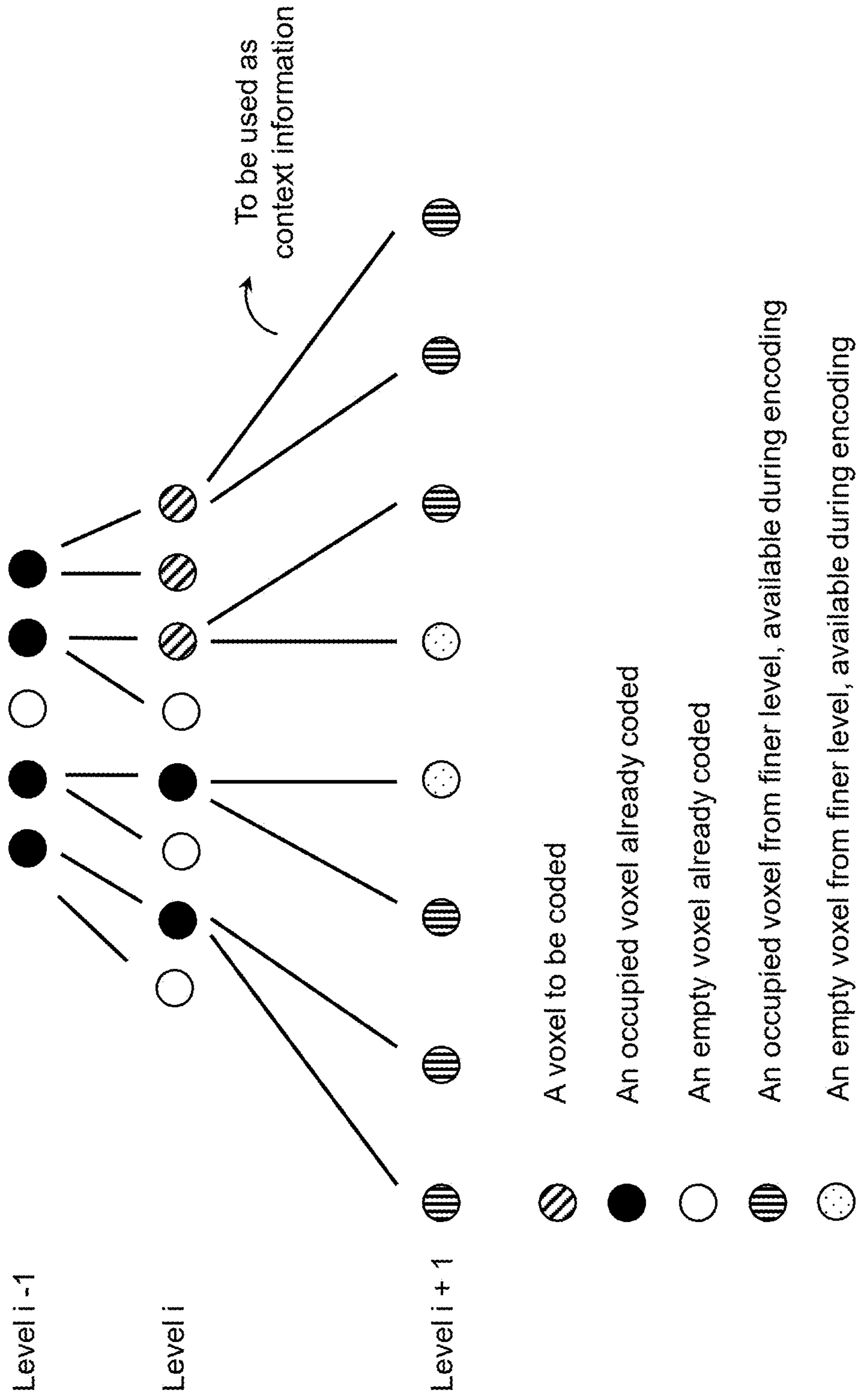
FIG. 5 illustrates voxels in different levels.
Figure 6:
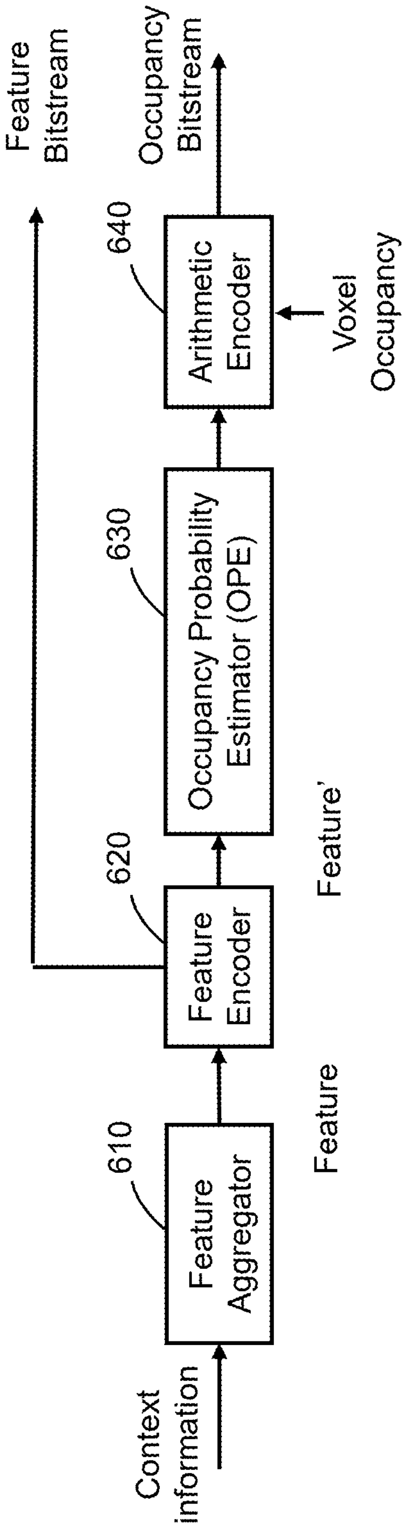
FIG. 6 illustrates proposed octree encoding using a learning-based method, according to an embodiment.

FIG. 5 illustrates a portion (level i−1, i, i+1) of the octree to be coded. FIG. 6 illustrates the proposed encoding method, according to an embodiment. Different from the method illustrated in FIG. 3, this method also encodes the features.

Specifically, unlike the feature extractor in prior-art method where the input is from its parent level and may be from the current level that has already been encoded/decoded, the proposed feature extractor/aggregator (610) uses the finer (child) level of details, or the complete current level (including those voxels that have not been encoded/decoded) as its input. Because the finer level of voxels or the complete current level always have more detailed information comparing to voxels from a parent level, it is much easier to extract more representative features.

Because the feature is extracted based on the finer or current level of voxels that are not yet coded, the extracted feature needs to be signaled in the bitstream. The feature generated by the feature aggregator (610) is encoded into bitstream by a feature encoder FE (620). In addition to generating the bitstream, the feature encoder also outputs the reconstructed feature, that may not be exactly the same as the feature from the feature aggregator (610). In one embodiment, the reconstructed feature is a quantized/de-quantized version of the feature from the feature aggregator. The reconstructed feature should match the decoded feature on a decoder.

The occupancy probability estimator (OPE) uses a neural network model to estimate occupancy probabilities of the voxels to be encoded. It takes the reconstructed feature as its input and computes (630) the occupancy probability of a current octree voxel. Based on the estimated probability, the arithmetic encoder (640) will encode the occupancy information of the current octree voxel into a bitstream. In the figure, two separate bitstreams are shown for the occupancy and feature. Alternatively, they can be multiplexed into one bitstream.

Feature Aggregator (610)

Figure 7:
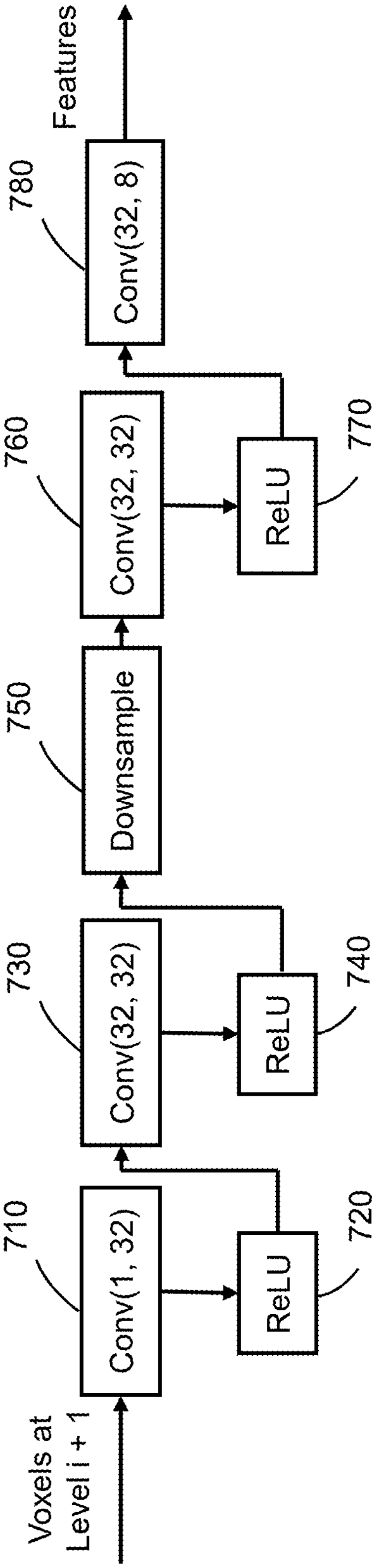
FIG. 7 illustrates a proposed feature aggregator (FA) with only one level as input, according to an embodiment.

In one embodiment, the feature aggregator (FA) is shown in FIG. 7. In this embodiment, the feature aggregator just takes the immediate next (finer) level of voxels as input to extract features. No feature is propagated from earlier (coarser) levels.

In this design of the feature aggregator (FA), it is composed of several 3D convolutional layers (with downsample), i.e., the "Conv" blocks (710, 730, 760, 780), where Conv (x, y) means the input feature channel size is x while the output feature channel size is y. All the convolutional layers, except for the last one, are appended by a ReLU activation function (720, 740, 770) to introduce non-linearity to the feature aggregation process. The "Downsample" block (750) is to downsample the feature from (i+1)-th to the i-th level. In more advanced embodiments, the convolutional layers can be replaced with other commonly used feature aggregation blocks, such as an Inception ResNet (IRN) block, and a Transformer block, and these blocks can be repeated several times to enhance the feature aggregation performance.

Figure 8:
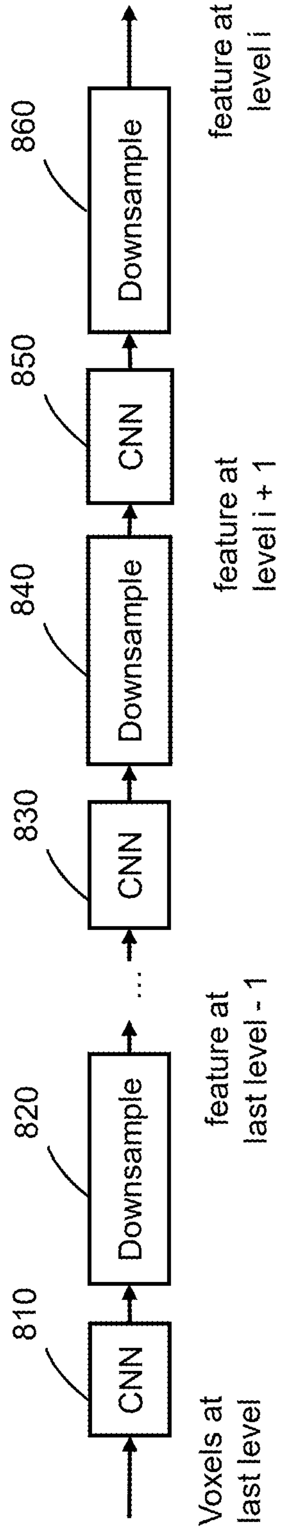
FIG. 8 illustrates a proposed feature aggregator (FA) with aggregated feature as input, according to an embodiment.

In another embodiment, the feature aggregator is shown in FIG. 8. The feature extraction and aggregation start from the finest level of octree. Comparing to the method illustrated in FIG. 7, the aggregated feature can be more powerful, as it undergoes a deeper network to propagate the feature all the way from the finest level to the current level.

Specifically, in this design of the feature aggregator (FA), it consists of several 3D convolutional neural network (CNN) blocks (810, 830, 850) followed by downsampling (820, 840, 860). The CNN module is simply composed of a series of back-to-back 3D convolutional layers with ReLU activation function appended after each convolutional layer. The "Downsample" blocks are to gradually downsample the feature from the last (finest) level to the i-th level. In more advanced embodiments, the CNN blocks can be replaced with other commonly used feature aggregation blocks, such as an Inception ResNet (IRN) block, and a Transformer block, and these blocks can be repeated several times to enhance the feature aggregation performance.

More generally, the feature aggregation can be based on any number of finer levels as well as the complete current level (including those voxels that have not been encoded/decoded) in the octree.

Feature Encoder (620)

Figure 9:
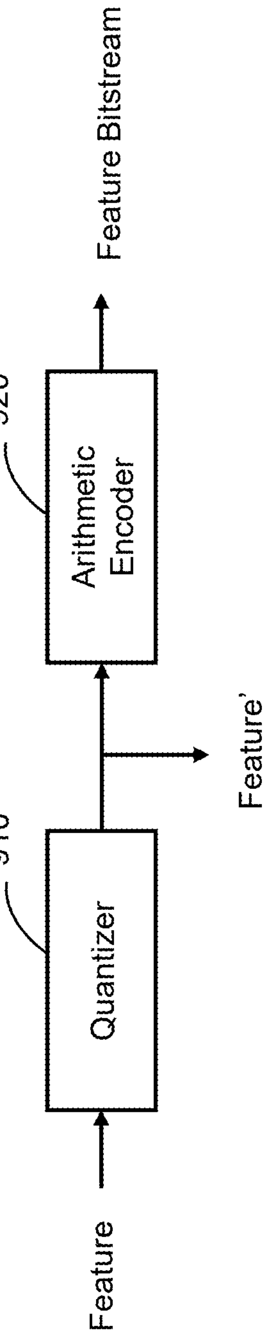
FIG. 9 illustrates a proposed feature encoder using uniform quantization, according to an embodiment.

The feature encoder can be implemented in various ways. In one embodiment, a proposed feature encoder using uniform quantization is shown in FIG. 9. The feature is quantized (910) based on a quantization step. The selection of quantization step is out of the scope of this work, but in general, it is a pre-selected parameter based on rate distortion requirement. The quantized feature is arithmetically encoded (920) into a feature bitstream.

Figure 10:
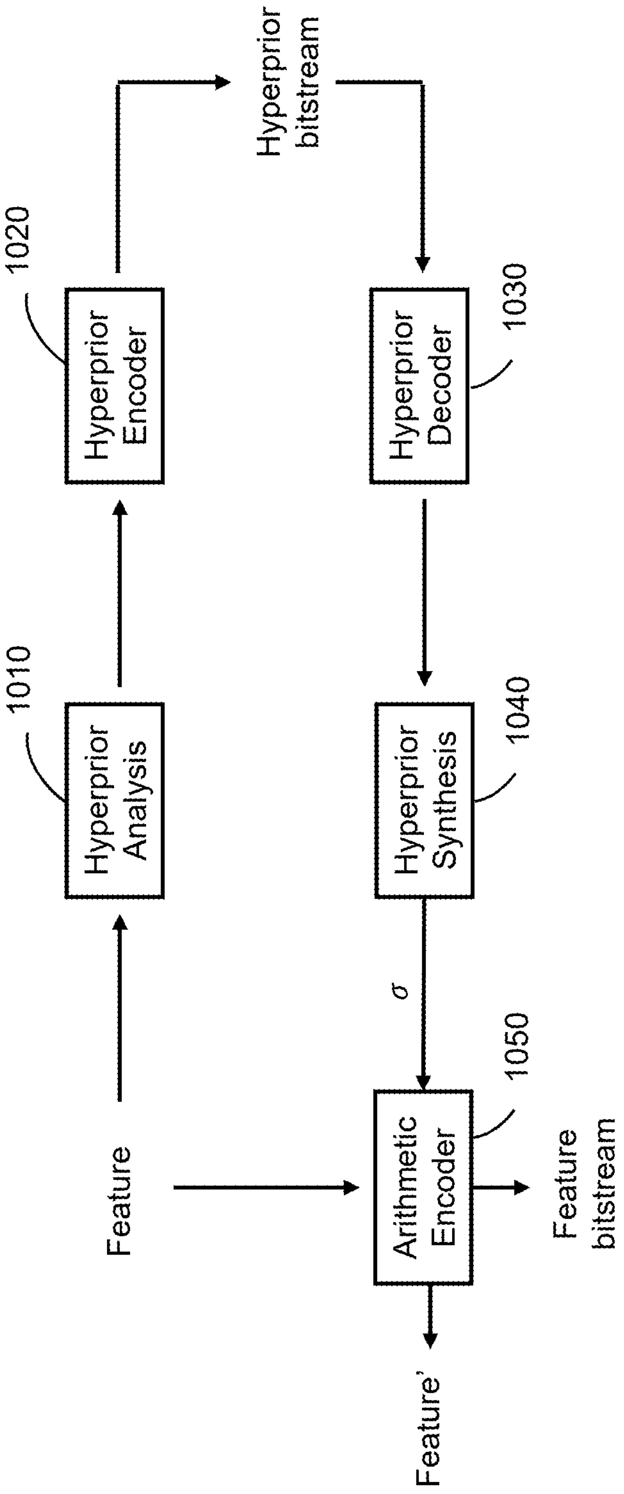
FIG. 10 illustrates a proposed feature encoder using hyperprior encoder, according to an embodiment.

In another embodiment, another feature encoder is proposed as shown in FIG. 10, which employs the hyperprior encoder. The purpose of this design is to analyze and utilize the distribution of the feature so as to perform efficient arithmetic coding of the feature.

The input feature is sent to a "hyperprior analysis" module (1010) to aggregate a hyperprior feature that is more abstract than the input feature. The hyperprior feature is much easier to be encoded. It is used to compute the hyperprior parameters later. The hyperprior features are encoded (1020) into a hyperprior bitstream, that may undergo some quantization first and arithmetic encoding.

The hyperprior bitstream is arithmetically decoded and dequantized (1030) to output a reconstructed hyperprior feature. The reconstructed hyperprior feature is sent to a "hyperprior synthesis" module (1040) to compute the distribution parameters of the input feature. In the embodiment shown in FIG. 10, the distribution parameters include variance parameters (σ) of the initial feature. In another embodiment, the distribution parameters include both the mean and the variance parameters of the initial feature.

The estimated hyperprior parameters (mean and variance) are provided to an arithmetic encoder (1050) to encode the input feature. The feature encoder with hyperprior encoder is more advanced than the feature encoder shown in FIG. 9. It can provide higher coding performance. The "hyperprior analysis" (1010) and "hyperprior synthesis" (1040) modules are typically learnable neural network modules.

Occupancy Probability Estimator (630)

Figure 11:
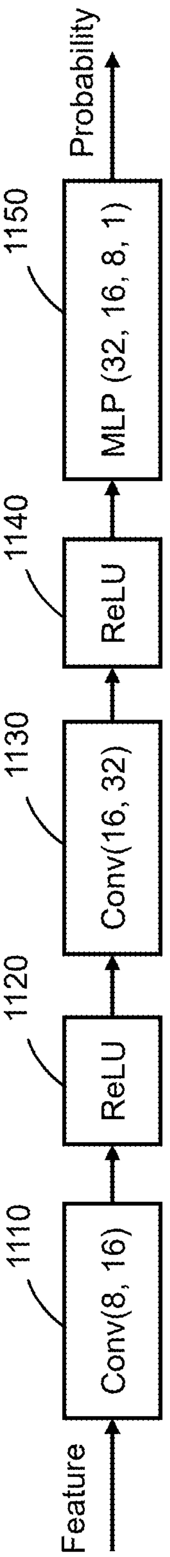
FIG. 11 illustrates a proposed occupancy probability estimator (in encoder and decoder), according to an embodiment.

In one embodiment, a proposed occupancy probability estimator (OPE) is shown in FIG. 11. Firstly, the feature is further aggregated/refined by a few convolutional layers (two Conv layers, 1110, 1130), where a ReLU activation function (1120, 1140) is appended after each Conv layer to introduce non-linearity. After that, it is passed to a multilayer perceptron (MLP, 1150) to finally compute the probability. In FIG. 11, the array (32, 6, 8, 1) after MLP indicates the channel size of the MLP layers. In the end, the occupancy probability is one scalar number, therefore the output channel of the MLP is one (1).

Figure 12:
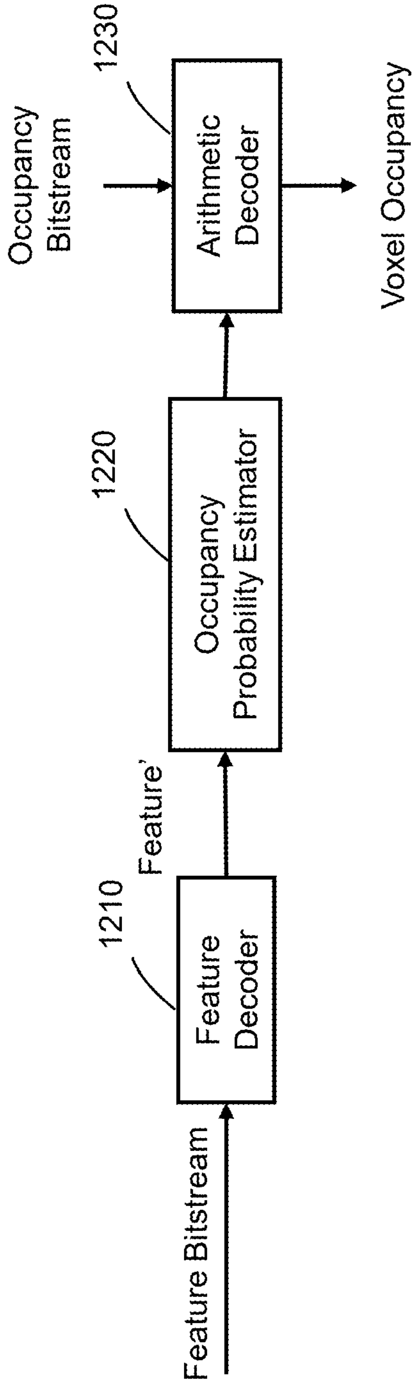
FIG. 12 illustrates proposed octree decoding using a learning-based method, according to an embodiment.

FIG. 12 illustrates a proposed decoding method corresponding to the encoding method illustrated in FIG. 6, according to an embodiment. A feature decoder (FD) decodes (1210) a feature from the input bitstream. Note that this is different from the previous method illustrated in FIG. 4, where the decoding starts with a feature extractor (410). Here in the proposed decoder, it begins with a feature decoder (1210). Basically, the decoder relies on a coded feature rather than to extract the feature from scratch by itself. The proposed decoder benefits from a more representative feature as the features were extracted using finer level of details or complete current level of detail than from the parent level as in the previous method. An occupancy probability estimator (OPE) computes (1220) an occupancy probability of a next octree voxel. This is the same OPE (620) in the encoding method in FIG. 6. Based on the estimated probability, an arithmetic decoder (1230) will determine if the next octree voxel is occupied or empty.

Feature Decoder (1210)

Figure 13A:
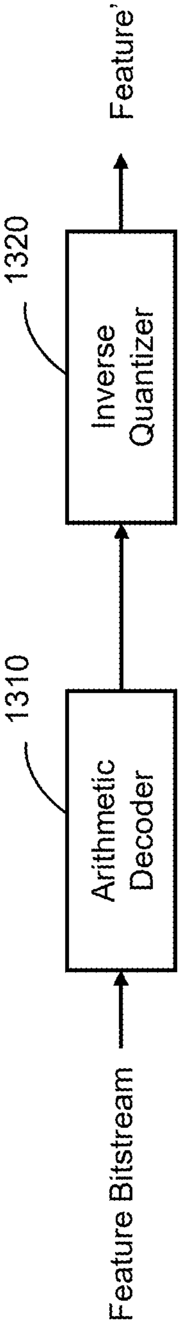
FIG. 13A illustrates a proposed feature decoder with a quantizer.

In one embodiment, a proposed feature decoder using uniform quantization is shown in FIG. 13A. This is the corresponding decoder of the encoder as shown in FIG. 9. Firstly, the input bitstream is arithmetically decoded (1310). Next, dequantization (1320) is conducted to output the decoded features.

Figure 13B:
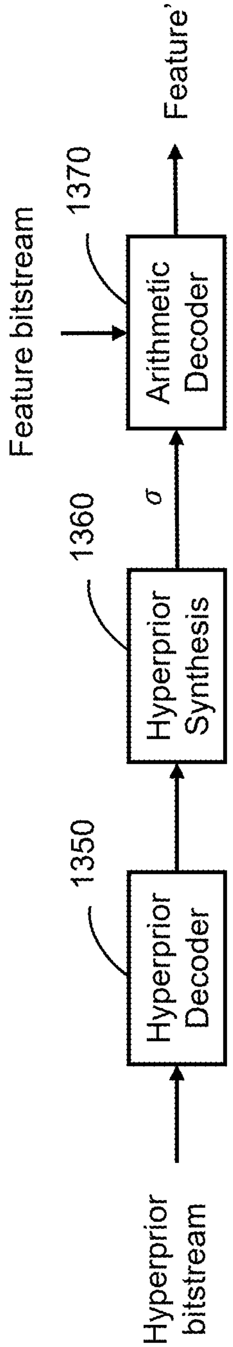
FIG. 13B illustrates a proposed feature decoder using hyperprior decoder, according to an embodiment.

In another embodiment, a proposed feature decoder using hyperprior decoding is shown in FIG. 13B. This decoder corresponds to the encoder as shown in FIG. 10. In particular, the coded hyperprior features is arithmetically decoded (1350) from a bitstream. The hyperprior features are sent to a "hyperprior synthesis" module (1360) to generate the distribution parameters to be used in the next step. In the embodiment shown in FIG. 13B, the distribution parameters include the variance. In another embodiment, the distribution parameters include both the mean and the variance parameters. The features coded in a bitstream is arithmetically decoded (1370) based on the estimated hyperprior parameters.

Note that the "hyperprior synthesis" and "hyperprior decoder" are the same as the models at the encoder as illustrated in FIG. 10. The arithmetic decoder (1370) of feature corresponds to the feature encoder (1050) of feature at the encoder as illustrated in FIG. 10.

Proposed Tree Coding in a Full Compression Framework

In the above, the principles of proposed octree encoding and decoding method are presented. In the follows, we describe how the proposed octree encoding and decoding are designed within a larger full compression framework.

In the proposed full point cloud compression framework, the octree-based coding is used to code the coarser level of point clouds (i.e., point cloud octree partitions) that requires lossless coding for an exact reconstruction. In one embodiment, when the proposed octree-based coding method is applied to code all octree levels, it leads to a lossless compression solution.

Figure 14A:
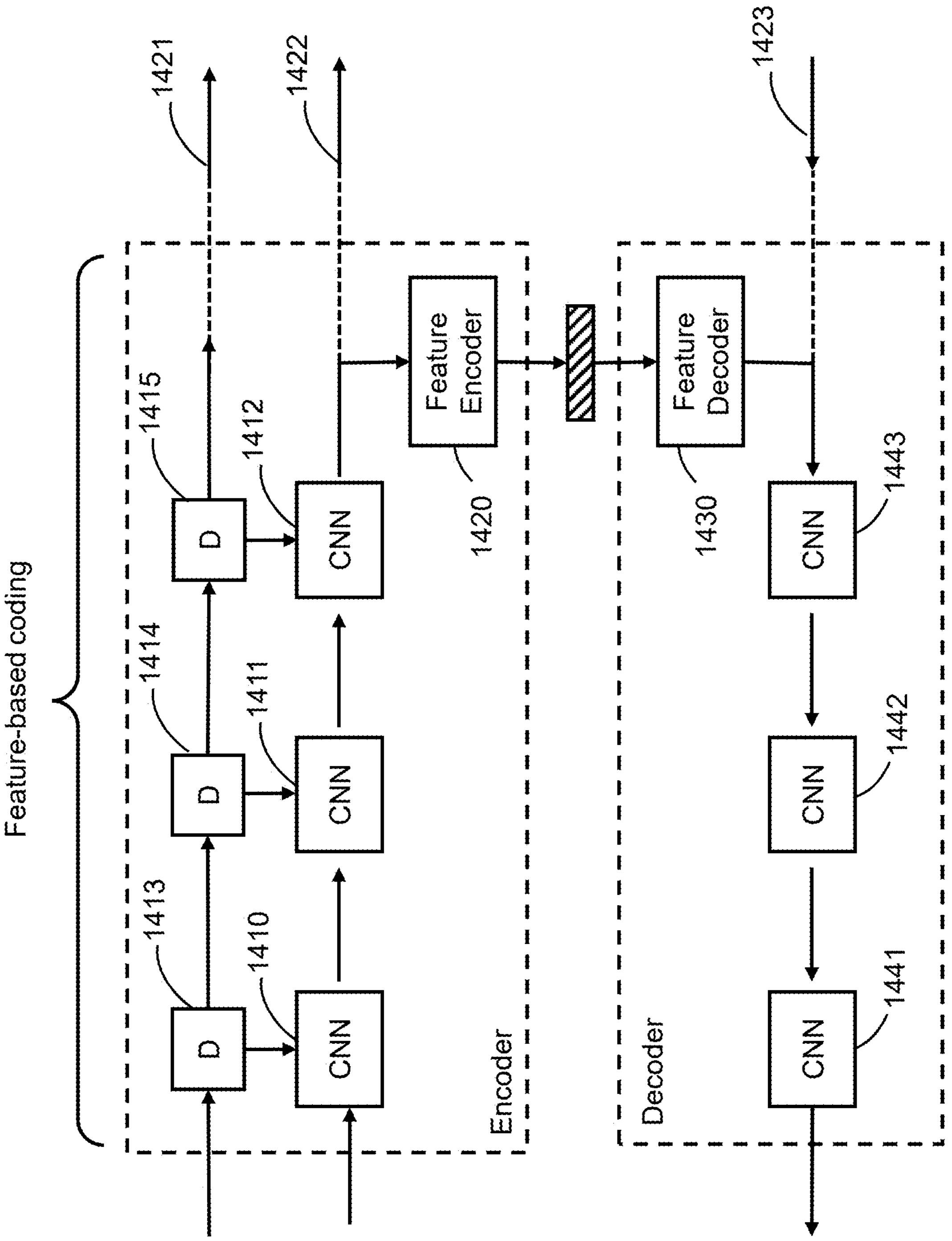
FIG. 14A and FIG. 14B illustrate traditional octree coding in a larger codec system.
Figure 14B:
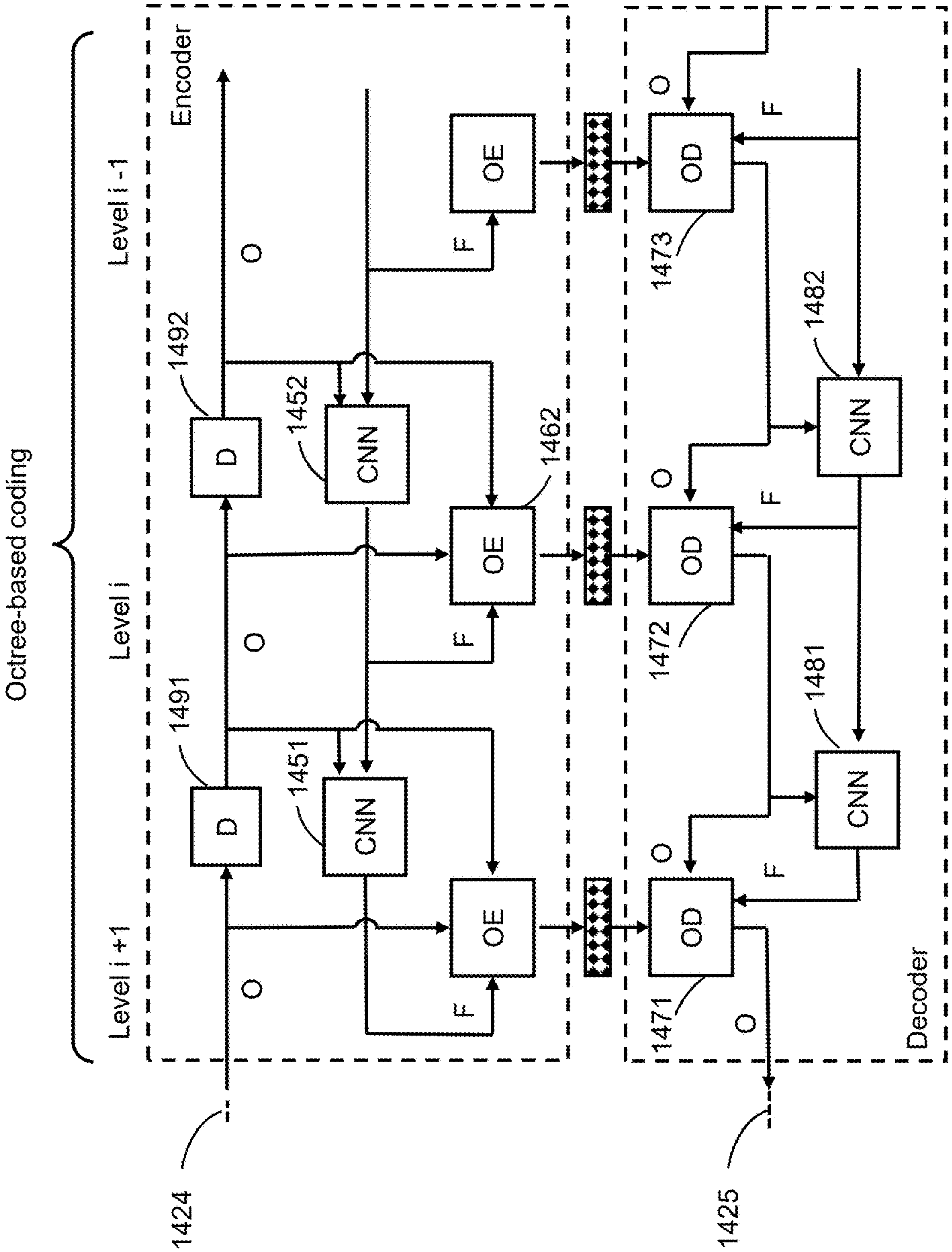

In one embodiment, as illustrated in FIG. 14A and FIG. 14B, the proposed octree-based coding is concatenated with a feature-based coding method. It leads to an overall lossy compression solution. In particular, the coarser portion of the point cloud is encoded with octree coding and the remaining finer portion of the point cloud is encoded by feature-based coding. The occupancy information output from the final level of feature-based encoding is used as input for the octree-based encoding. The occupancy information output from the final level of octree-based decoding is used as input for feature-based decoding. In FIG. 14B, we assume the final level of octree-based coding is level i+1 and coding for levels i−1, i and i+1 are illustrated. Note that in octree coding, the first level indicates the octree is to be coded, and other levels of octree coding will be implemented as for level i (except that the final level i+1 may have some slight adjustments).

Feature-Based Coding in the Full Compression Framework

FIG. 14A illustrates a feature-based coding method. The encoder is shown in the top part of the figures. In FIG. 14A, by applying "D" (1413, 1414, 1415) to the point cloud, the point cloud at a coarser level is obtained. It has a few CNN-like neural network modules (1410, 1411, 1412). They basically extract and aggregate a feature map from the input, for example, point cloud frames. During the feature extraction and aggregation, the resolution of the input is typically downsampled via pooling operations as part of the CNN-like neural network modules. Finally, the extracted feature is sent to a "Feature Encoder" (FE) module (1420) to output a bitstream.

The decoder is shown in the bottom part of the figure. A feature decoder (1430) decodes the features from the bitstream. The decoder has a few CNN-like neural network modules (1441, 1442, 1443). They correspond to the CNN-like neural network modules (with downsampling) in the encoder. Instead of performing downsampling/pooling, the CNN-like neural network modules reconstruct the input (e.g., point cloud) from the decoded features, via upsampling/unpooling. The CNN modules can be enhanced or replaced by MLP or some other neural network modules, such as the Inception ResNet (IRN) or Transformer blocks.

Full Compression Framework

We first adopt a previous octree-based compression method as shown in FIG. 3 (for encoder) and FIG. 4 (for decoder) in a traditional full compression framework as shown in FIG. 14B. In this figure, we show how the elementary encoding and decoding modules are concatenated to encode the octree up until level i+1. We note that in this full compression system combining FIG. 14A and FIG. 14B, the top arrow of FIG. 14A (1421) is connected to the top arrow of FIG. 14B (1424), while the bottom arrow of FIG. 14A (1423) is connected to the bottom arrow of FIG. 14B (1425).

In the top of the figure, we show CNN-like neural network modules being concatenated to perform feature extraction and/or aggregation (1451, 1452). Note that the direction of the flow from right to left indicates that in prior-art octree coding methods, the features are extracted from parent octree levels (and/or voxels already encoded/decoded in the current octree level). Each CNN represents a neural network module to generate/aggregate a feature map that is associated with a point cloud at certain resolution. The CNN module is the same at the encoder and decoder. If the encoder and decoder are implemented in the same device, they may share the CNN module. This CNN module corresponds to the feature extraction/aggregation FA module in FIG. 4.

When encoding the point cloud at level i, the encoder will take the point cloud at level i and level i−1 as input. We note that the point cloud at different levels is obtained by applying a series of downsampling blocks "D" in FIG. 14B, where each downsampling block "D" downsamples the point cloud by a factor of 2. In FIG. 14B, by applying "D" to the point cloud at level i+1 (1491), the point cloud at level i is obtained. Additionally, by applying "D" to the point cloud at level i (1492), the point cloud at level i−1 is obtained. For every occupied voxel in level i−1 (as indicated by output from the downsampling block 1492), the encoder will encode (1462) the occupancy information of their eight (8) child voxels at level i using module OE (occupancy encoder). Module OE corresponds to block OPE and AE in FIG. 3. Note that the output from the CNN (1452) is provided also to OE (1462) to assist the encoding, and "O" denotes the occupancy information and "F" denotes a feature map.

When decoding the point cloud at level i, the decoder will take the point cloud at level i-1 (output from 1473 indicating whether the current voxels is occupied or not) and the coded octree bitstream as input. The CNN-like neural network modules are concatenated to perform feature extraction and/or aggregation (1481, 1482) in the same manner as those (1451, 1452) in the encoder. The decoding is fulfilled via module OD (1472). Module OD corresponds to block OPE and AD in FIG. 4. The output occupancy information (O) from the module OD (1471) of the final level i+1 will be used as input for the feature-based coding illustrated in FIG. 14A to decode the remaining finer portion of the point cloud.

Full Compression Framework, Embodiment 1

Figure 15:
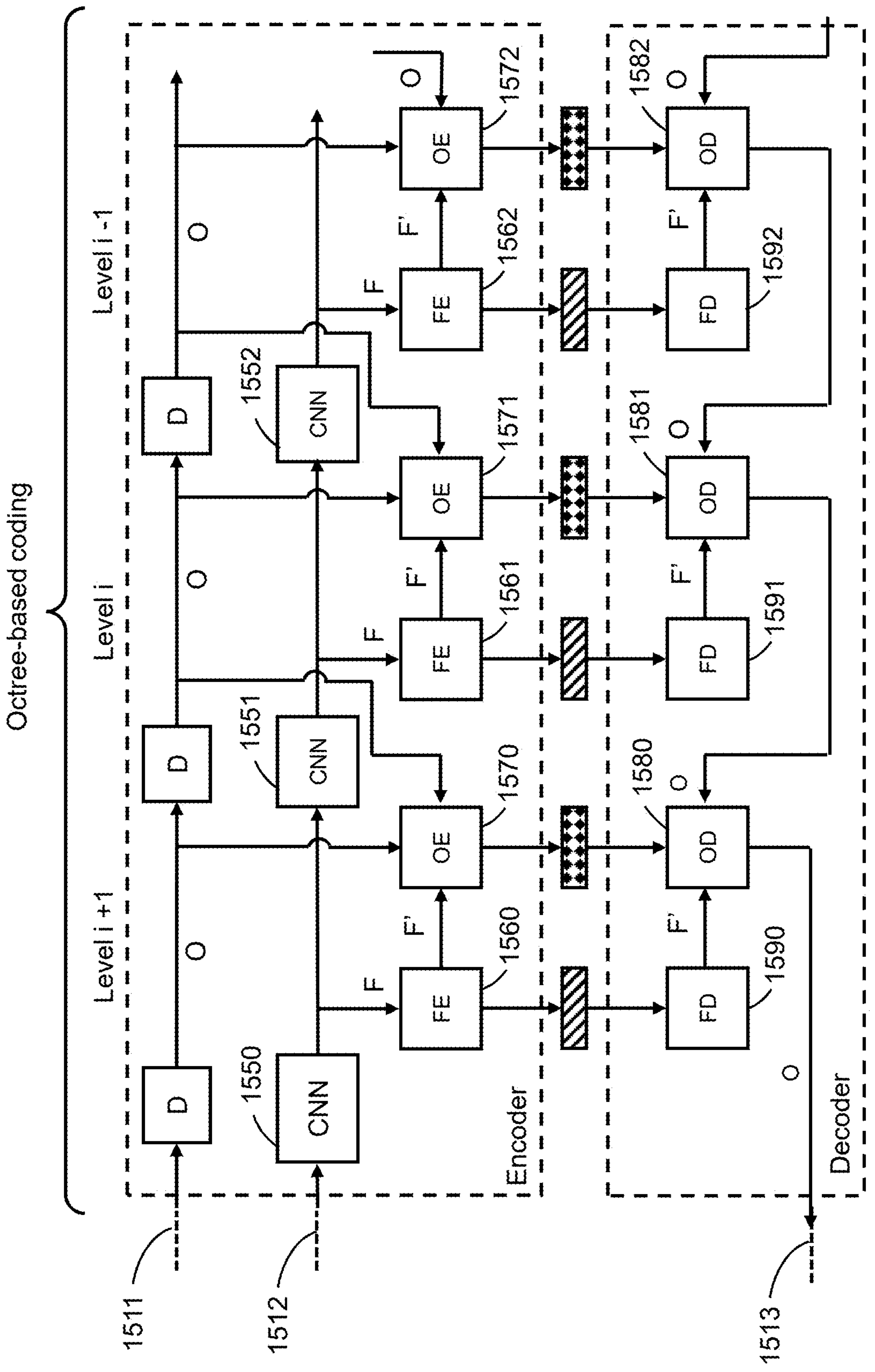
FIG. 15 illustrates a first proposed octree coding in a larger codec system, according to an embodiment.

In this embodiment, a proposed octree-based coding is in use. FIG. 15 illustrates how the proposed octree-based elementary coding blocks are concatenated according to this embodiment. We note that in a full compression framework combining FIG. 14A and FIG. 15, the top (1421), middle (1422), and bottom (1423) arrows of FIG. 14A are connected to the top (1511), middle (1512), and bottom (1513) arrows of FIG. 15, respectively. We could see some blocks and connections are the same between FIG. 14B and FIG. 15. The differences are described as follows.

First the CNNs (1550, 1551, 1552) in the top are now only used during encoding and they consecutively downsample the point cloud, unlike in FIG. 14B that they are also used in decoding with upsampling. This is a result that in the proposed octree-based coding, the features extracted by the CNNs are encoded into bitstreams. In earlier methods, they are not coded. Instead, the decoder runs the same feature extraction as the encoder. This is reflected by the feature encoding modules FE (1560, 1561, 1562) in FIG. 15. On decoder side, the feature is decoded by modules FD (1590, 1591, 1592). The decoded feature is used to assist the octree encoding OE (1570, 1571, 1572) at the encoder side and octree decoding OD modules (1580, 1581, 1582). For instance, to encode the octree at level i+1, a feature map at level i+1 is extracted from level i+2 via a CNN module (1550), such feature map will be further processed by another CNN module (1551) to obtain a feature map at level i to assist the coding of level i, and it will be further propagated in the same manner to assist the octree coding of other levels.

Also note that the direction to perform feature extraction by CNNs is now from left to right. It indicates that the feature extraction is based on a finer level of octree. Note all voxels in the current level may also be used since the encoder has access to the whole octree. For the earlier method that does not transmit the feature bitstream, they cannot use any voxel not yet decoded for feature extraction. We note that although the feature extraction proceeds from left to right, i.e., from a finer to a coarser level, the encoding/decoding process still needs to be done from right to left, i.e., from a coarser level to a finer level, because the finer level occupancy information is built on top of a known coarser level. Thus, during encoding/decoding, we first perform the feature extraction from left to right. Then we perform encoding/decoding from right to left, level-by-level, based on the extracted features.

In one embodiment, the feature outputted for use at level i is generated with every voxel that are occupied at level i. In addition, features are also generated for non-occupied voxels if its parent voxel is occupied. These features are later used by octree encoding OE and octree decoding OD to compute the occupancy probabilities of all the voxels to be encoded/decoded at level i.

Full Compression Framework, Embodiment 2

Figure 16:
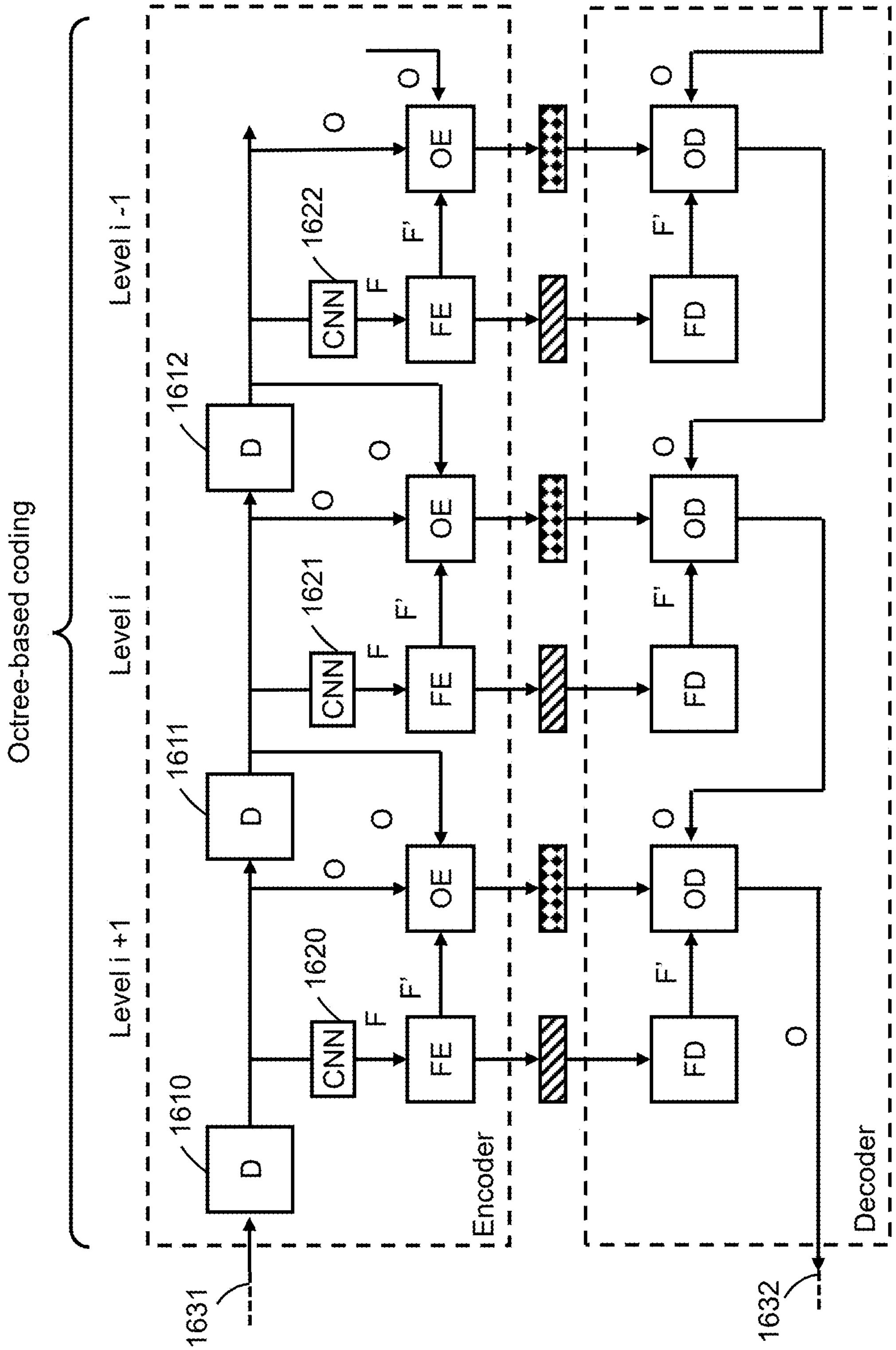
FIG. 16 illustrates a second proposed octree coding in a larger codec system, according to an embodiment.

In this embodiment, the framework illustrated in FIG. 15 is updated as illustrated in FIG. 16. The update is on the encoder side. First, note that in the full compression framework combining FIG. 14A and FIG. 16, the top arrow of FIG. 14A (1421) is connected to the top arrow of FIG. 16 (1631), and the bottom arrow of FIG. 14A (1423) is connected to the bottom arrow of FIG. 16 (1632). The CNNs (feature aggregation) in FIG. 15 are simplified by using downsampling modules (1610, 1611, 1612) where the downsampling modules takes the occupancy of the previous octree level and outputs the occupancy of the corresponding octree level. The CNNs typically have both feature extraction and pooling (downsampling) steps. In this design, it is proposed to simplify the process by having only the downsampling at the top of FIG. 16.

The motivation of the simplification is to remove the feature aggregation/propagation across several levels. Instead, the features are always extracted by the CNN solely based on the point cloud at the current resolution, e.g., level i.

A few new CNNs (1620, 1621, 1622) are inserted right before the Feature Encoding FE module. The new CNN (1621) at resolution i in FIG. 16 takes the point cloud at resolution i as input, and then generates features to help the octree coding. The motivation of this design is that, since the objective is to encode the octree at level i, then using information from level i alone to generate the feature would be sufficient (though may not be optimal). This is different from the CNN (1551) in FIG. 15 where the input to the CNN at resolution i is the point cloud at resolution i+1. Because the input to the new CNN are not yet coded, that is, the decoder wouldn't be able to derive such information, and thus, the feature information is encoded. In general, when we use voxels that are after the current voxel in the encoding (decoding) order for feature extraction, the extracted feature needs to be transmitted in the bitstream.

Full Compression Framework, Embodiment 3

Figure 17:
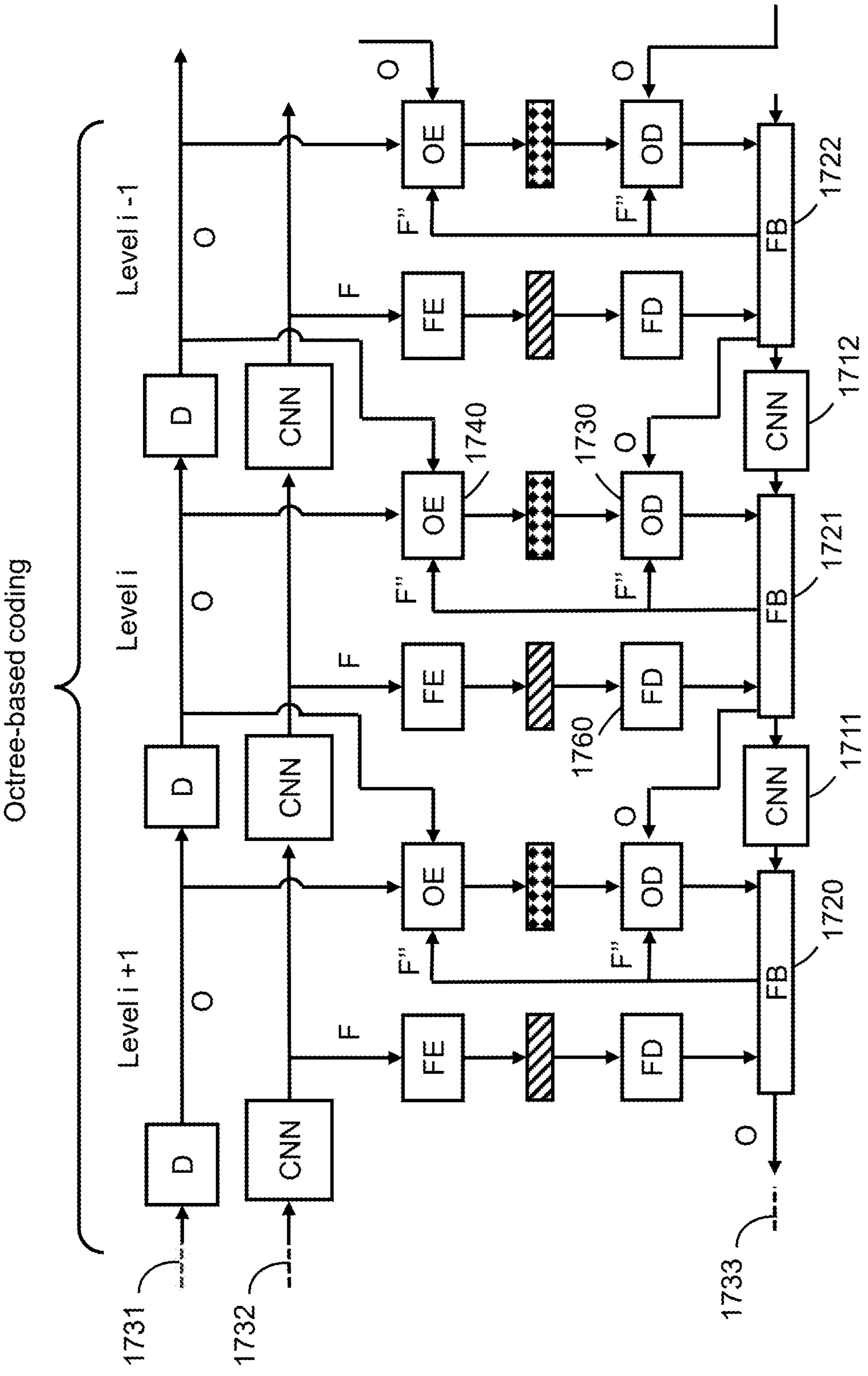
FIG. 17 illustrates a third proposed octree coding in a larger codec system, according to an embodiment.

In this embodiment, the framework illustrated in FIG. 15 is updated as illustrated in FIG. 17. The update is on both the encoder and decoder sides. This embodiment is motivated by having a stronger feature to assist the octree encoding and decoding. We note that in a full compression framework combining FIG. 14A and FIG. 17, the top (1421), middle (1422), and bottom (1423) arrows of FIG. 14A are connected to the top (1731), middle (1732), and bottom (1733) arrows of FIG. 17, respectively.

In FIG. 15, the feature in use is just the feature extracted from the encoding pipeline. In this embodiment (FIG. 17), the feature extracted/encoded/decoded is treated as a residual information. It is not directly used to assist octree encoding and decoding. Instead, a feature aggregation pipeline is introduced, that starts from the root level (from the right side of the figure). Just like CNNs in feature-based decoding, the CNNs (1711, 1712) are to perform feature aggregation and unpooling (upsampling).

At a given level, e.g., level i, the outputted feature of the CNN (1712) is to be enhanced by the feature decoded from the bitstream in a Feature Blending FB module (1721). In this sense, the feature decoded from the bitstream serves as a residual/supplement to further improve the outputted feature of the CNN. Then instead of using F' in FIG. 14B, FIG. 15 and FIG. 16, the enhanced feature F" is to assist octree encoding OE (1740) and octree decoding OD (1730). Here, for simplicity for the drawing, we assume the encoder and decoder are implemented in the same device, and thus, the encoder can share the same CNN and FB modules (1711, 1712, 1720, 1721, 1722) with the decoder. When the encoder and decoder are implemented separately, these modules will be implemented for both the encoder and decoder.

Figure 18:
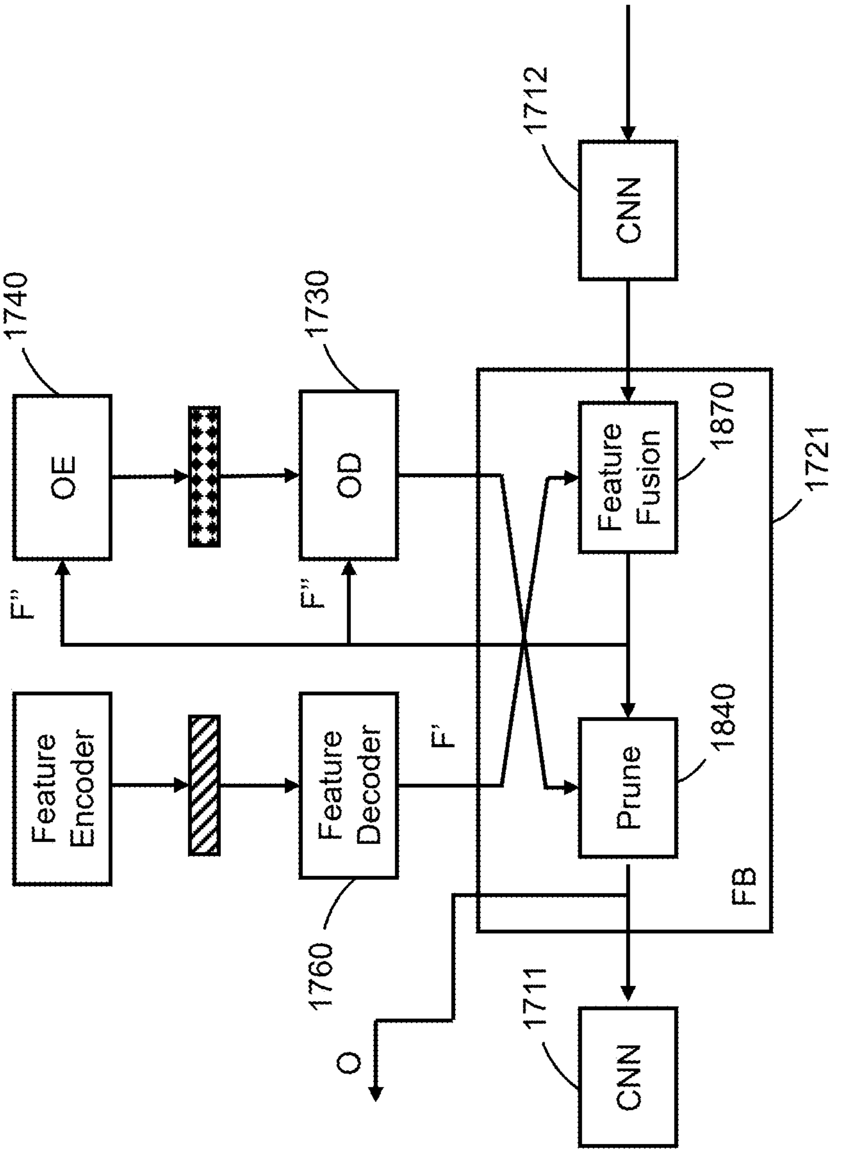
FIG. 18 illustrates a proposed feature blending (FB) block, according to an embodiment.

The feature blending module FB (1721) also takes the outputted point cloud by OD module (1730) as input to prune the feature map for further aggregation. Details of the feature blending module are illustrated in FIG. 18, according to an embodiment. In FIG. 18, it can be seen that the outputted feature from CNN (1712) for the parent level and the decoded feature from the feature decoder (1760) for the current level are sent to a Feature Fusion FF module (1870). The two features are to be fused and enhanced. Basically, the Feature Fusion module first concatenates the two input features, followed by applying an FA block to enhance the fused feature. Note that the two input features and the output features are for all occupied voxels at resolution i and all non-occupied voxels if their parent voxel at level i−1 is occupied.

The outputted feature from the Feature Fusion module is sent to octree encoding (1740) or decoding module (1730). Thus, the FB block exists on both encoder and decoder sides. On the encoder side, it is needed to compute F", so that F" can be used by OE to obtain the occupancy bitstream.

Finally, with the point cloud at level i is decoded by OD (1730), the outputted feature from Feature Fusion module (1870) is pruned (1840). All features on actually empty voxels are removed. The pruned feature is sent to the CNN (1711) for next level of feature aggregation.

Full Compression Framework, Embodiment 4

Figure 19:
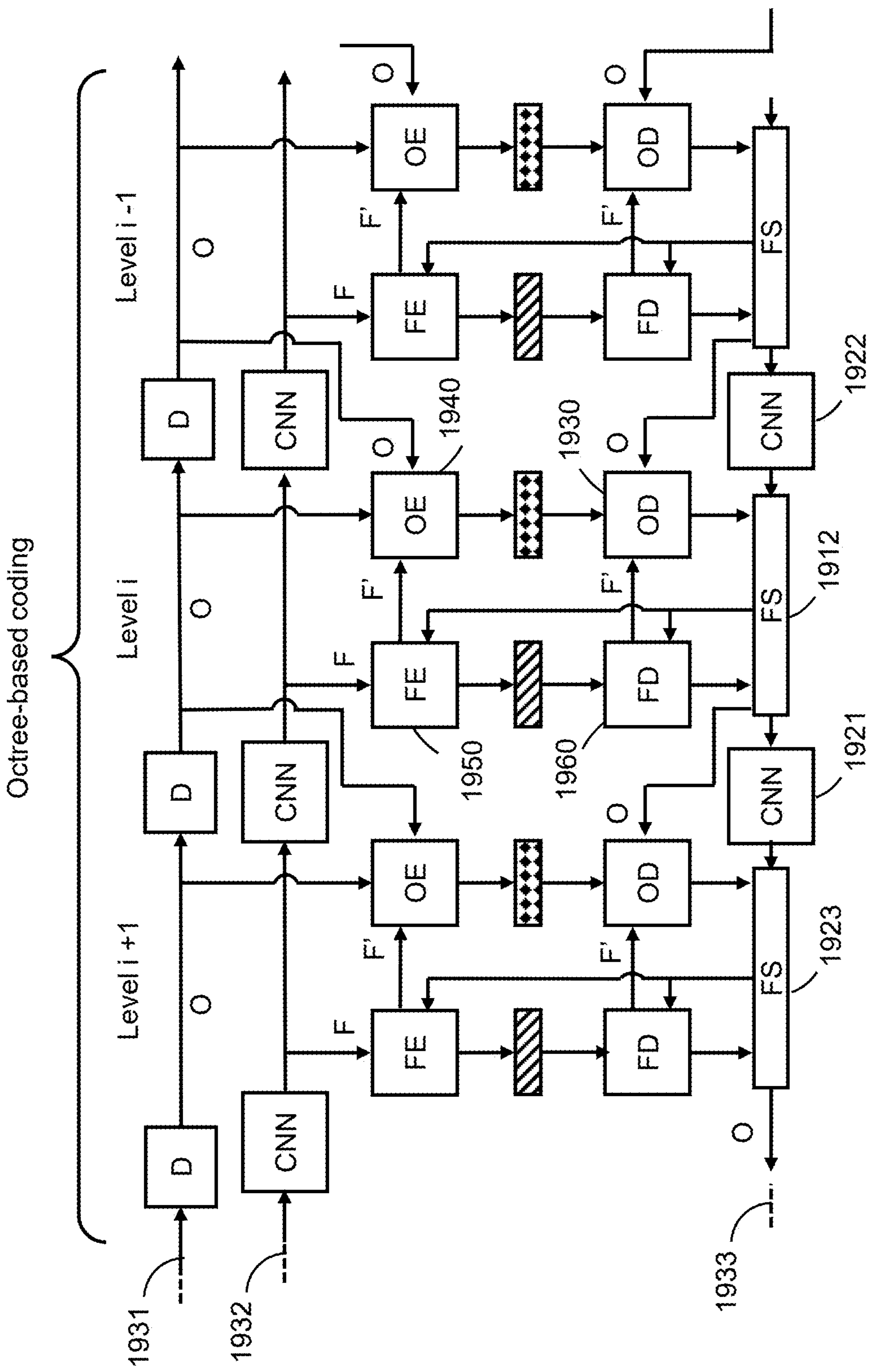
FIG. 19 illustrates a fourth proposed octree coding in a larger codec system, according to an embodiment.

In this embodiment, the framework in FIG. 17 is updated as in FIG. 19. This embodiment is motivated by using a different way to benefit the coding performance. We note that in a full compression framework combining FIG. 14A and FIG. 19, the top (1421), middle (1422), and bottom (1423) arrows of FIG. 14A are connected to the top (1931), middle (1932), and bottom (1933) arrows of FIG. 17, respectively.

In this embodiment, the block FB in FIG. 17 is replaced by FS block in FIG. 19. The new FS block (1912) takes the output of CNN block (1922) as input. One output of FS block (1912) is a set of estimated hyperprior parameters that is sent to feature encoding block FE (1950) and feature decoding block FD (1960). The motivation behind is to use the coded information in bitstreams from coarser levels to estimate the hyperprior parameters of the features in the current level. The idea is similar to the diagram described in FIG. 13B, but the coded feature is not encoded from a hyperprior encoder but from the coded feature of the previous level. Thus, a hierarchical hyperprior model is in use to encode or decode the features.

The new FS block (1912) further takes the output of occupancy decoder OD block (1930) as its input. Finally, a second output from FS block (1912) is sent to the CNN (1921) for next level of feature aggregation.

Figure 20:
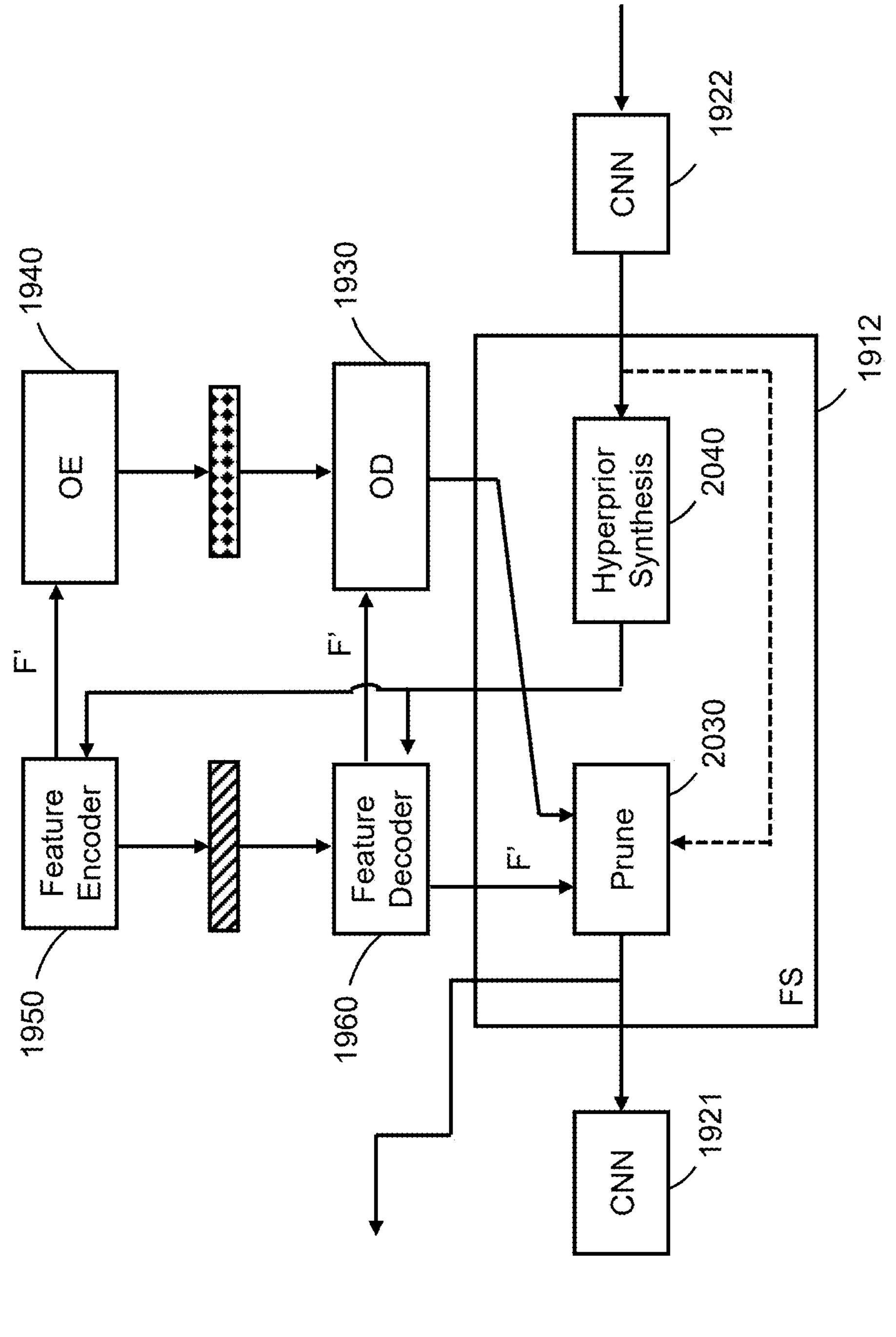
FIG. 20 illustrates a proposed FS block, according to an embodiment.

FIG. 20 shows detailed design in the FS block, according to an embodiment. First the output feature from CNN (1922) for the parent level is consumed by a hyperprior synthesis block HS (2040). The HS block outputs the hyperprior parameters, and the parameters are sent to feature encoding block FE (1950) and feature decoding block FD (1960). Then the features reconstructed from feature encoding and decoding blocks are used to assist the occupancy encoding block OE (1940) and occupancy decoding block OD (1930), respectively. We note that the FS block exists on both encoder and decoder sides. On the encoder side, it is needed to compute F', so that F' can be used by OE to obtain the occupancy bitstream.

The output from occupancy decoding block (1930) is the final reconstruction of point cloud at the current resolution. The reconstructed point cloud is finally used to prune (2030) the decoded features from FD block. The pruned feature is sent to the next CNN (1921) for feature aggregation when the current level is not the final level for the lossless octree coding.

In another embodiment, the prune module (2030) also takes the CNN feature as input (corresponds to the dotted line in FIG. 20). In this example, the pruning first fuses the CNN feature and the decoded feature. Then the fused feature is pruned according to the reconstructed point cloud in the current resolution.

In another embodiment, to encode or decode the feature for feature-based coding (FIG. 14A), a CNN module, followed by a FS module at level i+2, are also appended after the FS module for level i+1 (1923), and the FS module at level i+2 produces hyperprior parameters to assist the encoding (1420) or decoding (1430) of the feature in the feature-based coding stage.

Unified Feature-Based Coding and Octree-Based Coding

In the above, we mainly describe different octree-based coding methods. Here, we further extend the approach above for octree-based coding to feature-based coding. This leads to a unified coding framework where the feature-based coding and octree-based coding share the same backbones to code the features.

We take the octree-based coding method shown in FIG. 19 as an example to illustrate how the feature coding method introduced in octree coding can be extended to feature-based coding pipeline. The other octree-based coding methods proposed in this work, e.g., FIG. 17, can also be extended to feature-based coding in a similar manner. When concatenating the feature-based coding in FIG. 21 with other octree-based coding methods proposed in this work, the connection of the top arrow (2121) is the same as that of the top arrow in FIG. 14A (1421). Similarly, the connection of the middle arrow of FIG. 21 (2122) is the same as that of the middle arrow in FIG. 14A (1422), and the connection of the bottom arrow of FIG. 21 (2123) is the same as that of the bottom arrow in FIG. 14A (1423).

Figure 21:
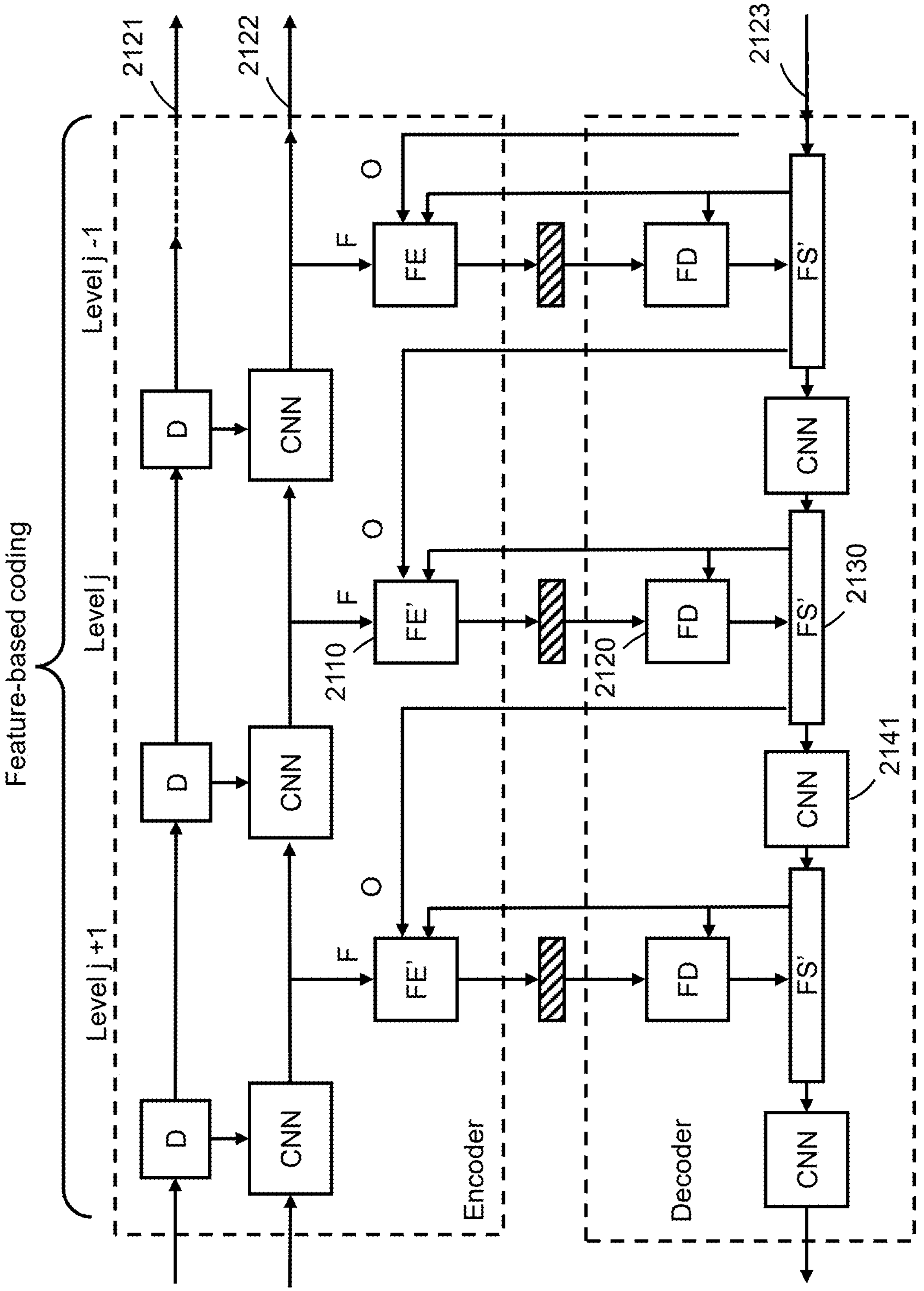
FIG. 21 illustrates a proposed end-to-end learning-based point cloud compression framework, according to an embodiment.

FIG. 21, in conjunction with FIG. 19, shows the unified feature-based coding and octree-based coding, according to an embodiment. The feature-based coding pipeline is now enhanced using a proposed method. As a result, the feature-based coding pipeline (FIG. 21) and octree-based coding pipeline (FIG. 19) share the same backbone to encode features.

A traditional feature-based coding typically just encodes the feature at the bottleneck level (where the level smaller or equal to it uses octree coding and larger than it uses feature-based coding) into one bitstream as shown in FIG. 14A. In the proposed embodiment in FIG. 21, the bottleneck level separating feature-based coding and octree-based coding is the level j−1. In addition to the bitstream encoded at the bottleneck level (as FIG. 19), additional bitstreams for the other levels are further encoded.

During the encoding of features in each level of feature-based coding pipeline (starting from j−1) in FIG. 21, the feature encoding FE' (2110) and feature decoding FD (2120) are assisted by the FS' block (2130) at the same level in a similar way as presented in the diagram for octree-based coding in FIG. 19. The FS' block (at the same level) outputs a set of hyperprior parameters for the feature to be coded at the current layer. The set of hyperprior parameter can benefit the coding of the features in current layer.

Additionally, since the coarser level may be already encoded in a lossy manner (e.g., we want to encode a bitstream at level j but the geometry at level j−1 is already encoded in the lossy manner), the FS' block from the coarser level needs to provide the (lossy) reconstructed occupancy/coordinates to the FE' block at the current level, so that FE' interpolates the input F to match the lossy reconstructed geometry, followed by generating a bitstream associated with the decoded lossy geometry.

Figure 22:
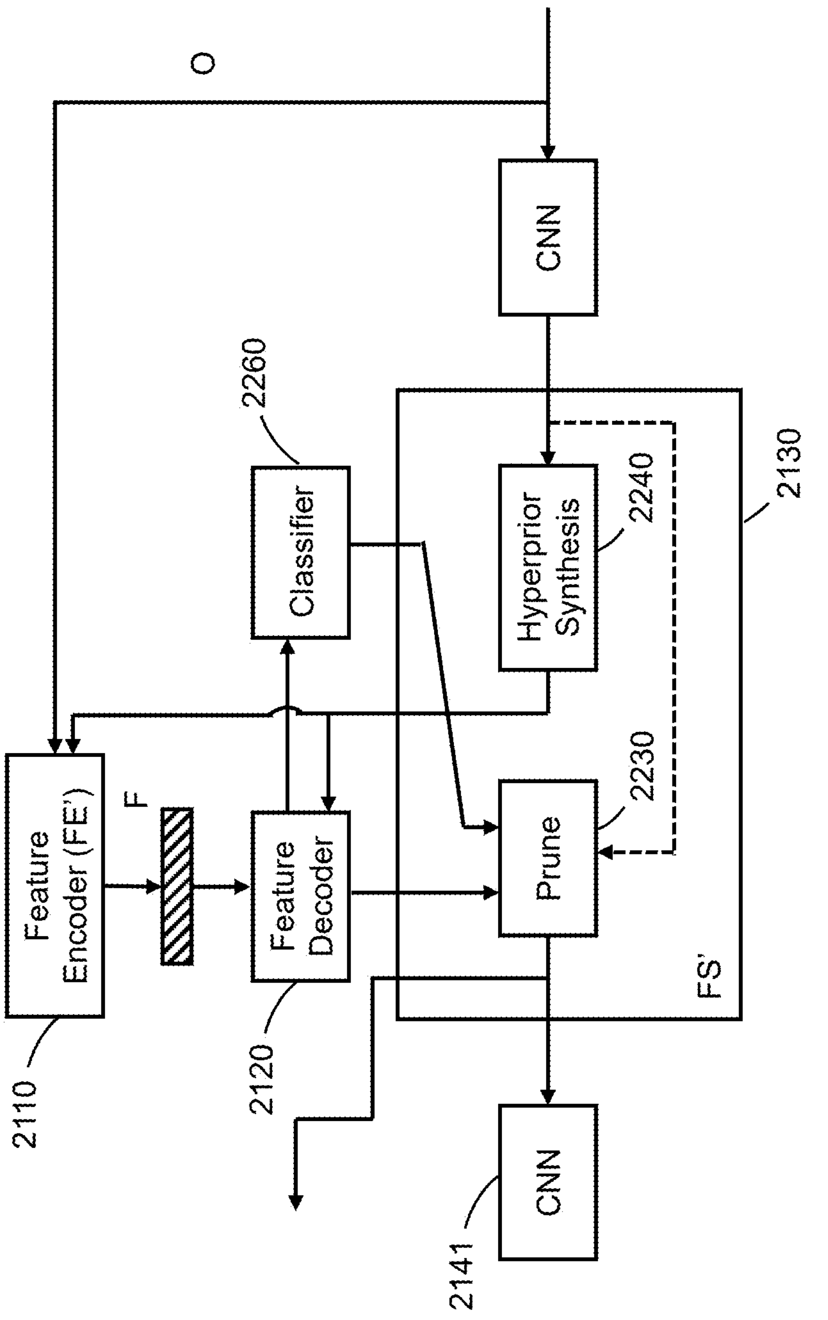
FIG. 22 illustrates a proposed FS' block, according to an embodiment.

The FS' block in FIG. 21 is similar to the FS block in FIG. 19. Because there is no octree decoding OD in feature-based coding pipeline, the FS block is updated to FS' block. The details of FS' block are shown in FIG. 22, according to an embodiment. The CNN feature is sent to a hyperprior synthesis HS block (2240) to estimate a set of hyperprior parameters. The hyperprior parameters are used to help the feature encoding (2110) and decoding (2120). The decoded feature from FD block is sent to a classifier (2260). Since this is for feature-based coding, the reconstruction point cloud at the current layer will be finally determined by a classifier network. The classifier network would compute an occupancy probability of each candidate voxel. The voxels with top probabilities will be determined to be occupied. Hence a reconstruction of point cloud for the current layer is produced. Finally, the decoded feature map from FD block is pruned (2230) according to the reconstructed point cloud. The pruned feature map is sent to the next CNN (2141) for feature aggregation.

Figure 23:
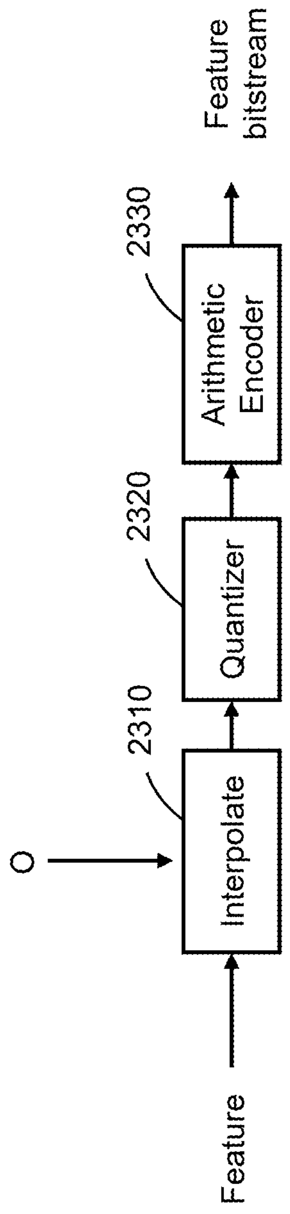
FIG. 23 illustrates a proposed feature encoder, according to an embodiment.
Figure 24:
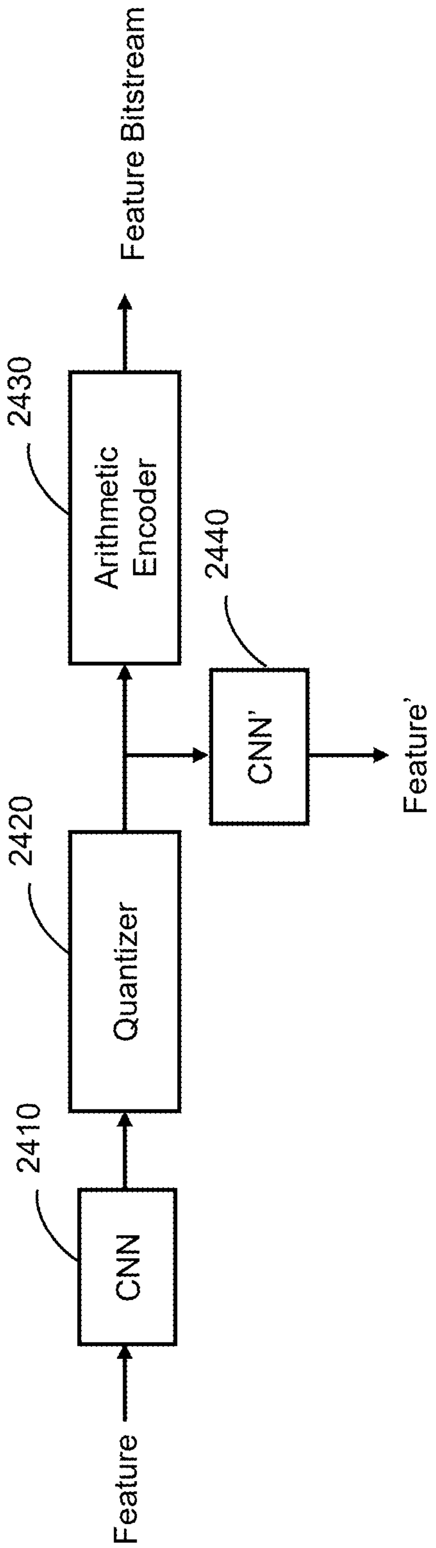
FIG. 24 illustrates a proposed feature encoder using uniform quantization, according to another embodiment.
Figure 25:
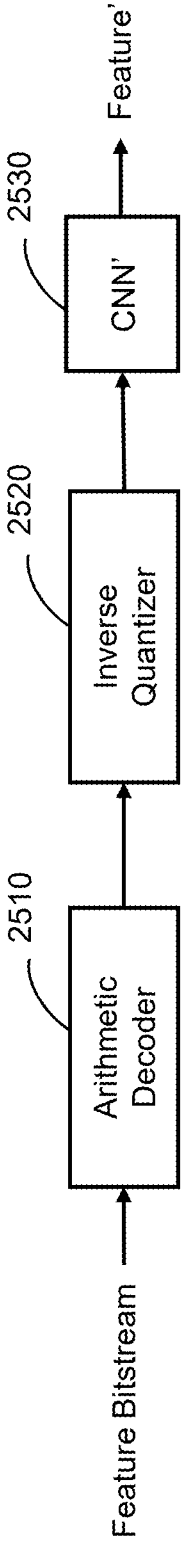
FIG. 25 illustrates a proposed feature decoder with a quantizer, according to another embodiment.

The diagram of the feature encoder FE' (2210) is shown in FIG. 23. Compared to FE in FIG. 9, FE' have an additional occupancy/coordinate input O. Interpolation is used to align the occupancy of the feature from finer levels with the lossy reconstruction occupancy from the coarser level. In one embodiment, the "Interpolate" module (2310) in FIG. 23 can be implemented using any feature aggregation module to preprocess the input feature F, followed by a targeted convolution module where the target coordinates of the output are specified to be the lossy reconstruction occupancy O. Next, the output by the "Interpolate" module is fed to the quantizer (2320), followed by the arithmetic encoder (2330), the same as the FE module in FIG. 9.

Parameter Sharing

In the design of FIG. 15, FIG. 16, FIG. 17, FIG. 19 and FIG. 21, the CNN blocks on the encoder side may have the same architectures, and the CNN blocks on the decoder side may also have the same architectures. In one embodiment, such similarity of network architecture motivates us to propose the following:

1) Let all the CNN blocks on the encoder side to share the same set of network parameters;
2) Let all the CNN blocks on the decoder side to share the same set of network parameters.

Without the proposed model sharing, the feature-based coding and octree-based coding needs two sets of separate neural networks parameters. It not only makes the overall parameter size larger but also requires retraining and reloading of the neural network parameters when the bottleneck level separating feature-based coding and octree-based coding is changed.

With this proposed embodiment, the feature-based (lossy) coding and octree-based (lossless) coding are additionally unified under the same set of encoder and decoder CNN pairs. During inference, the codec can be reconfigurable while maintaining the conformance/compatibility using the same set of neural network parameters.

Additional Down-/Up-Sampling for Feature Encode/Decoder

To reduce the bitstream size generated by the feature encoder and feature decoder, one can add additional down-sampling to the feature encoder and additional up-sampling to the feature decoder. In one embodiment, the feature encoder FE is updated from FIG. 9 to FIG. 24 where a CNN module (2410) consisting of two-times downsampling and FA module is prepended before the quantization module (2420) and the arithmetic encoder (2430). To obtain the reconstructed feature, a CNN' module (2440) consisting of two-times upsampling and FA module is applied to the quantization output.

The feature decoder FD is also updated from FIG. 13A to FIG. 25, where the same CNN' module (2530) as that of FE is appended after the arithmetic decoder (2510) and the inverse quantization module (2520). In this way, when encoding/decoding the i-th octree level, a feature at level (i−1) will be actually encoded/decoded due to the additional down-/up-sampling.

Figure 26:
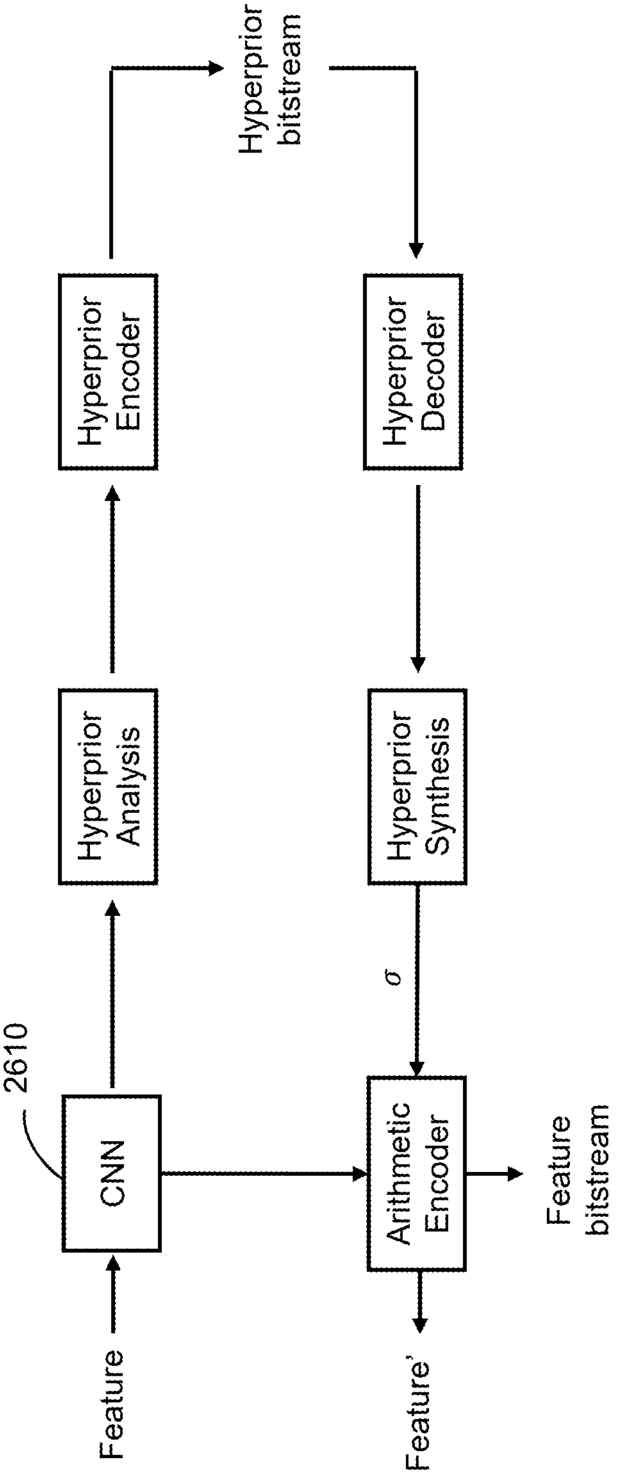
FIG. 26 illustrates a proposed feature encoder using hyperprior encoder, according to another embodiment.
Figure 27:
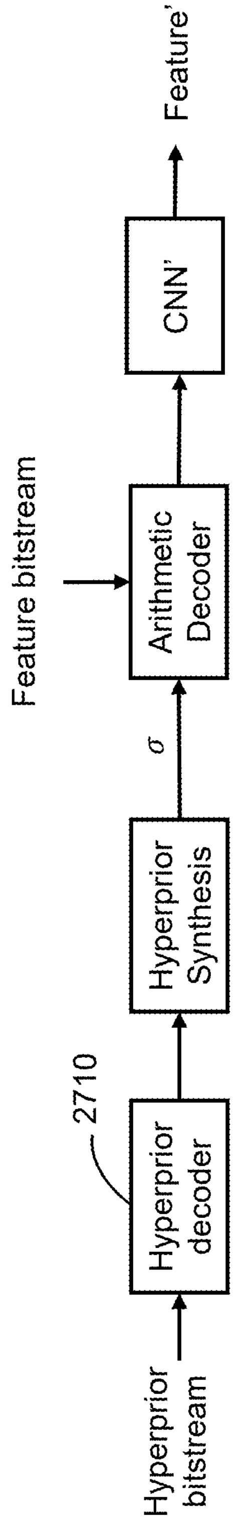
FIG. 27 illustrates a proposed feature decoder using hyperprior decoder, according to another embodiment.

Similar updates can be applied when hyperprior parameters are additionally encoded/decoded. In this embodiment, the FE in FIG. 10 is updated to FIG. 26, where similar to the previous embodiment, a CNN module for downsampling and feature aggregation (2610) is applied to the input feature at the first step, while the rest of the steps remains the same as FIG. 10. On the decoder side, the FD in FIG. 13B is updated to FIG. 27, where a CNN' module for upsampling and feature aggregation (2740) is appended at the end to obtain the decoded feature map while the other modules remain the same as that of FIG. 13B.

High-Level Syntax and Processes

In one example, the high-level syntax and process of the decoder with FIG. 15 is provided below for reference.

TABLE 1

Sequence level parameter set syntax

| | Descriptor |
|---|---|
| structure seq__sps( ) | |
| { | |
| bit__depth | u(8) |
| bit__depth__lossless | u(8) |
| has__feature__lossy | u(1) |
| ... | |
| } | |

TABLE 2

Syntax of decoding one frame

| | Descriptor |
|---|---|
| decode__frame( ) | |
| { | |
| occupancy = init__occupancy( ) /* initialize the root voxel*/ | |
| for (level = 0; level < bit__depth__lossless; level++) | |
| { | |
| payload__feature__lossless | ae(v) |
| payload__occupancy__lossless | ae(v) |
| feature__lossless = decode__feature__lossless(payload__feature__lossless) | |
| occupancy = decode__occupancy(payload__occupancy__lossless, feature__lossless, occupancy) | |
| } | |
| if (has__feature__lossy) | |
| { | |
| payload__feature__lossy | ae(v) |
| decode__feature(payload__feature__lossy, occupancy, bit__depth__losslesss, bit__depth) | |
| } | |
| } | |

TABLE 3

Pseudo code of decoding one sequence

```
main(string bitstream__file)
{
  read__seq__sps( )
  while (1)
  {
    if (EOF) break
    decode__frame( )
  }
}
```

The semantics of the syntax elements in Table 1 and Table 2 are provided as follows:

bit_depth specifies the total bit depth of the input point cloud.

bit_depth_lossless specifies the number of bit-depth levels that are encoded with tree structure. Particularly, from the root level to the level indicated by bit_depth_lossless, the point cloud is encoded losslessly with a tree structure. From the bit_depth_lossless+1 to the last level, it is encoded in a lossy manner with feature-based coding. bit_depth_lossless equals i+1 in FIG. 15.

has_feature_lossy specifies whether lossy feature coding exists. If it is 1, the decoder continues to parse the feature syntax element payload_feature_lossy and decode the lossy occupancy information. Otherwise, the decoding of the lossy occupancy information would be skipped.

payload_feature_lossless is the payload of the feature for the lossless coding of the current level. It is a string generated by the feature encoder (e.g., 1561) to assist the lossless octree coding, which contains information of the finer or current level.

payload_occupancy_lossless is the payload of the occupancy for the lossless coding of the current level. It is a string generated by the occupancy encoder (e.g., 1571) containing occupancy information of the current level.

payload_feature_lossy is the payload of the feature for the lossy coding for level bit_depth_lossless+1 to the last level. It is a string generated by the feature encoder (e.g., 1420) containing information of levels bit_depth_lossless+1 to the last level.

Also note that for the descriptors:

ae(v): arithmetic entropy-coded syntax element.

u(n): unsigned integer with n bits.

Some of the processes in Table 2 are described below:

decode_feature_lossless( ) For level i, this process corresponds to FD (1591). It takes as input the syntax element feature_lossless and outputs the decoded feature to assist lossless octree coding.

decode_occupancy( ) For level i, this process corresponds to OD (1581). This process takes as inputs the syntax element payload_occupancy_lossless, as well as feature_lossless and the occupancy of the previous level. It losslessly decodes and outputs the occupancy of the current level.

decode_feature( ) This process corresponds to the "Decoder" in FIG. 14A. It takes as inputs the syntax elements payload_feature_lossy, bit_depth_lossless, bit_depth, as well as the occupancy (of level bit_depth_lossless) output by decode_occupancy( ) It outputs the occupancy at bit_depth level (in a lossy manner).

payload_feature_lossy, occupancy, lossless_bit_depth, bit_depth

Note that Table 3 provides the pseudo code of decoding one sequence where the sequence level parameters are first read, followed by decoding the sequence iteratively.

The CNN modules presented in the designs above are just for example. Advanced neural network architectures can be applied without changing the intended technologies. Additionally, the proposed method applies to other tree-based coding other than octree coding.

Arithmetic encoding and decoding are used in various examples. They can be replaced by other entropy encoding and decoding methods, respectively.

Various numeric values are used in the present application. The specific values are for example purposes and the aspects described are not limited to these specific values.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of decoding point cloud data, comprising:

entropy decoding features representing voxels in a tree structure, wherein feature for a current voxel is representative of at least a set of voxels that are still to be reconstructed;

determining an occupancy probability of the current voxel based on the feature;

decoding occupancy information of voxels in the tree structure, wherein whether the current voxel is occupied or not is decoded based on the occupancy probability for the current voxel; and reconstructing the point cloud data based on the occupancy information.

2. The method of claim 1, wherein the set of voxels includes one or more voxels in a child level of, or in a same level as, the current voxel in the tree structure.

3. The method of claim 1, wherein the decoding occupancy information comprises:

parsing one or more syntax elements indicative of occupancy information of the current voxel, wherein whether the current voxel is occupied is decoded losslessly by arithmetic decoding the one or more syntax elements based on the occupancy probability.

4. The method of claim 1, wherein the tree structure contains levels 0, 1, . . . , N, wherein the obtaining features of voxels, the determining an occupancy probability of the current voxel being occupied based on the feature, and the decoding occupancy information are performed for each of levels 1 to N.

5. The method of claim 1, wherein the obtaining features further comprises:

obtaining another feature; and generating a first feature based on the another feature and the feature of voxels in the tree structure, wherein the occupancy probability of the current voxel is determined based on the first feature.

6. The method of claim 5, further comprising:

pruning the first feature to form a second feature representative occupancy information of a current level.

7. The method of claim 1, wherein the obtaining features further comprises:

obtaining another feature; and generating a set of hyperprior parameters based on the another feature, wherein the features of voxels in a tree structure are decoded based on the set of hyperprior parameters, and wherein the occupancy probability of the current voxel being occupied is determined based on the decoded feature.

8. The method of claim 1, wherein a coarser portion of the point cloud data is decoded losslessly and a finer portion is decoded by lossy compression, the lossy compression comprising:

decoding features for the remaining portion of the point cloud data; and reconstructing the remaining portion of point cloud data based on the features for the remaining portion.

9. The method of claim 8, wherein a plurality of neural networks are used in decoding the coarser portion and the finer portion of the point cloud, wherein the plurality of neural networks share same network architecture and network parameters.

10. The method of claim 8, further comprising:

obtaining a second feature representing voxels in a tree structure computed for a parent level in the remaining portion of the point cloud; and generating a second set of hyperprior parameters based on the second feature, wherein the features of voxels in the remaining portion of the point cloud are decoded based on the second set of hyperprior parameters, and wherein the decoded feature of voxels in the remaining portion of the point cloud is used by a classifier to generate the occupancy probability.

11. The method of claim 1, wherein the tree structure is an octree structure.

12. A method of encoding point cloud data, comprising:

obtaining features representing voxels in a tree structure, wherein feature for a current voxel is obtained from at least a set of voxels that are still to be encoded;

determining an occupancy probability of the current voxel based on the feature;

entropy encoding the feature; and encoding occupancy information of voxels in the tree structure, wherein whether the current voxel is occupied or not is encoded based on the occupancy probability for the current voxel.

13. The method of claim 12, wherein the encoding occupancy information comprises:

entropy encoding one or more syntax elements indicative of occupancy information of the current voxel, wherein whether the current voxel is occupied is encoded losslessly by arithmetic encoding the one or more syntax elements based on the occupancy probability.

14. The method of claim 12, wherein a coarser portion of the point cloud data is encoded losslessly and a finer portion is encoded by lossy compression, the lossy compression comprising:

encoding features for the remaining portion of the point cloud data.

15. An apparatus for decoding point cloud data for a point cloud, comprising one or more processors and at least one memory coupled to the one or more processors, wherein the one or more processors are configured to:

entropy decode features representing voxels in a tree structure, wherein feature for a current voxel is representative of at least a set of voxels that are still to be reconstructed;

determine an occupancy probability of the current voxel based on the feature;

decode occupancy information of voxels in the tree structure, wherein whether the current voxel is occupied or not is decoded based on the occupancy probability for the current voxel; and reconstruct the point cloud data based on the occupancy information.

16. The apparatus of claim 15, wherein the set of voxels includes one or more voxels in a child level of, or in a same level as, the current voxel in the tree structure.

17. The apparatus of claim 15, wherein the one or more processors are configured to decode occupancy information by performing:

parsing one or more syntax elements indicative of occupancy information of the current voxel, wherein whether the current voxel is occupied is decoded losslessly by arithmetic decoding the one or more syntax elements based on the occupancy probability.

18. An apparatus for encoding point cloud data for a point cloud, comprising one or more processors and at least one memory coupled to the one or more processors, wherein the one or more processors are configured to:

obtain features representing voxels in a tree structure, wherein feature for a current voxel is obtained from at least a set of voxels that are still to be encoded;

determine an occupancy probability of the current voxel based on the feature;

entropy encode the feature; and encode occupancy information of voxels in the tree structure, wherein whether the current voxel is occupied or not is encoded based on the occupancy probability for the current voxel.

19. The apparatus of claim 18, wherein the one or more processors are configured to encode occupancy information by performing:

entropy encoding one or more syntax elements indicative of occupancy information of the current voxel, wherein whether the current voxel is occupied is encoded losslessly by arithmetic encoding the one or more syntax elements based on the occupancy probability.

20. The apparatus of claim 18, wherein a coarser portion of the point cloud data is encoded losslessly and a finer portion is encoded by lossy compression, the lossy compression is configured to encode features for the remaining portion of the point cloud data.

* * * * *